US006765965B1

(12) United States Patent
Hanami et al.

(10) Patent No.: US 6,765,965 B1
(45) Date of Patent: Jul. 20, 2004

(54) MOTION VECTOR DETECTING APPARATUS

(75) Inventors: Atsuo Hanami, Hyogo (JP); Tetsuya Matsumura, Hyogo (JP); Satoshi Kumaki, Hyogo (JP); Kazuya Ishihara, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/425,214

(22) Filed: Oct. 22, 1999

(30) Foreign Application Priority Data

Apr. 22, 1999 (JP) .......................................... 11-114664

(51) Int. Cl.[7] .............................. H04B 1/66; H04N 7/12
(52) U.S. Cl. ................................................. 375/240.16
(58) Field of Search ........................ 375/240.9, 240.01, 375/240.12, 240.13, 240.14, 240.15, 240.16, 240.17, 240.22; 348/699, 398, 415.1, 416.1; 382/236; 358/106; H04N 7/12; H04B 1/66

(56) References Cited

U.S. PATENT DOCUMENTS

| | | | | | |
|---|---|---|---|---|---|
| 5,200,820 | A | * | 4/1993 | Gharavi ...................... 358/106 |
| 5,400,087 | A | * | 3/1995 | Uramoto et al. ............ 348/699 |
| 5,576,772 | A | * | 11/1996 | Kondo ........................ 348/699 |
| 5,619,268 | A | * | 4/1997 | Kobayashi et al. ....... 348/416.1 |
| 5,784,108 | A | * | 7/1998 | Skalezky et al. .......... 348/415.1 |
| 5,930,403 | A | * | 7/1999 | Sperling et al. ............ 382/276 |
| 5,949,486 | A | * | 9/1999 | Ishihara et al. |
| 6,108,039 | A | * | 8/2000 | Linzer et al. ............... 348/398 |
| 6,122,317 | A | * | 9/2000 | Hanami et al. .............. 375/240 |
| 6,212,237 | B1 | * | 4/2001 | Minami et al. ......... 375/240.16 |
| 6,289,052 | B1 | * | 9/2001 | Faryar et al. .......... 375/240.16 |
| 6,307,969 | B1 | * | 10/2001 | Yamashita et al. .......... 382/236 |
| 6,332,002 | B1 | * | 12/2001 | Lim et al. .............. 375/240.17 |

FOREIGN PATENT DOCUMENTS

| | | | |
|---|---|---|---|
| JP | 7-250328 | * | 9/1995 |
| JP | 9-37269 | * | 2/1997 |
| JP | 9-154140 | * | 6/1997 |
| JP | 9-163380 | * | 6/1997 |

OTHER PUBLICATIONS

"VLSI Architectures for Video Compression–A Survey", P. Pirsch et al., Proceedings of the IEEE, vol. 83, No. 2, Feb. 1995, pp. 220–246.*
"ULSI Realization of MPEG2 Realtime Video Encoder and Decoder–An Overview", M. Yoshimoto et al., IEICE Trans. Electron, vol. E78–C, No. 12, Dec. 1995, pp. 1668–1681.*
"MPEG2 Encoding LSIs about to Change Audiovisual Equipment for Household Use", Nikkei Electronics, No. 711, Mar. 9, 1998, pp. 134–154.*
"A Half–pel Precision MPEG2 Motion–Estimation Processor with Concurrent Three–Vector Search", K. Ishihara et al., IEEE International Solid–State Circuits Conference, Digest of Technical Papers, 1995, pp. 288–289.*
"A Motion Estimation Processor for MPEG2 Video Real Time Encoding at Wide Search Range", A. Ohtani et al., IEEE Custom Integrated Circuits Conference, 1995, pp. 405–408.*

(List continued on next page.)

Primary Examiner—Tung Vo
(74) Attorney, Agent, or Firm—McDermott Will & Emery LLP

(57) ABSTRACT

A plurality of motion detecting units of which at least a template block size, i.e., the number of estimation pixels, or a search area size is different among the motion detecting units are used adaptively according to the characteristic of, or the prediction coding type of, a target picture. This enables efficient motion vector detection to be accomplished without increasing the amount of hardware or power consumption.

12 Claims, 19 Drawing Sheets

OTHER PUBLICATIONS

"A 165–GOPS Motion Estimation Processor with Adaptive Dual–array Architecture for High Quality Video–Encoding Applications" A. Hanami et al., IEEE Custom Integrated Circuits Conference, 1998, pp. 169–172.*

"A 1.5W Single–Chip MPEG2 MP@ML Encoder with Low–Power Motion Estimation and Clocking", M. Mizuno et al., IEEE International Solid–State Circuits Conference, Digest of Technical Papers, 1997, pp. 256–257.*

* cited by examiner

F I G. 3
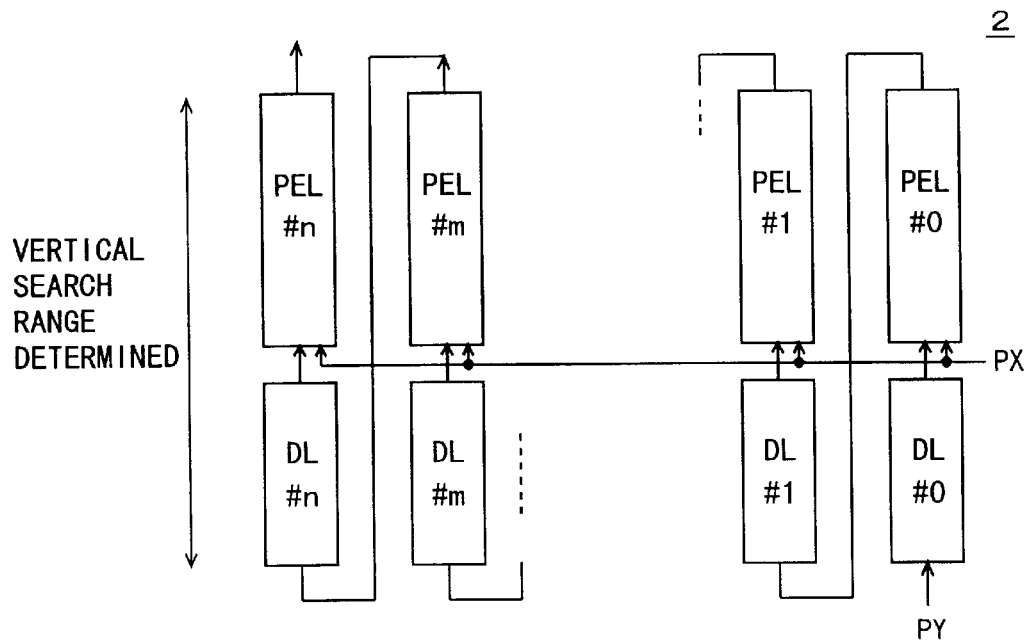
F I G. 4
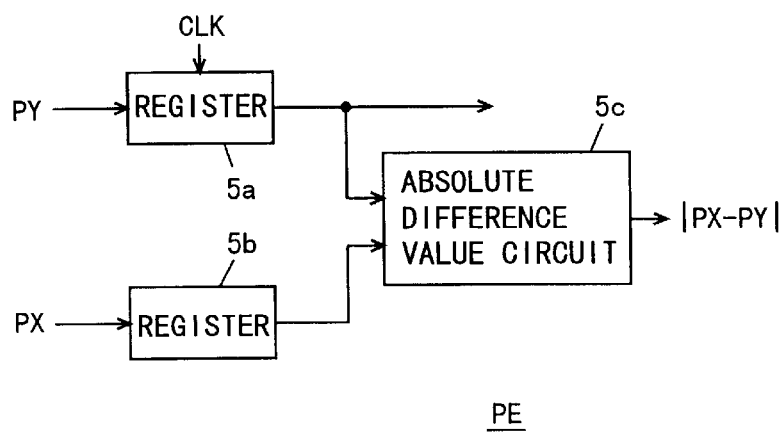

6 : ELEMENT PROCESSORS PROVIDED CORRESPONDING TO PIXELS

FIG. 9A   FIG. 9B
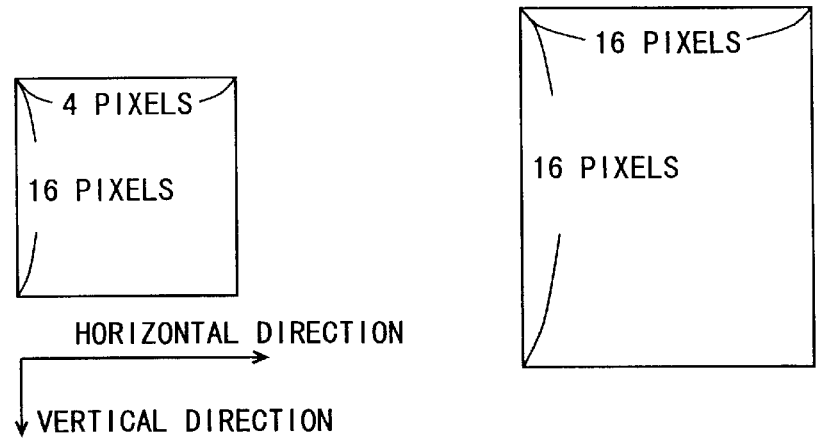
FIG. 10A   FIG. 10B
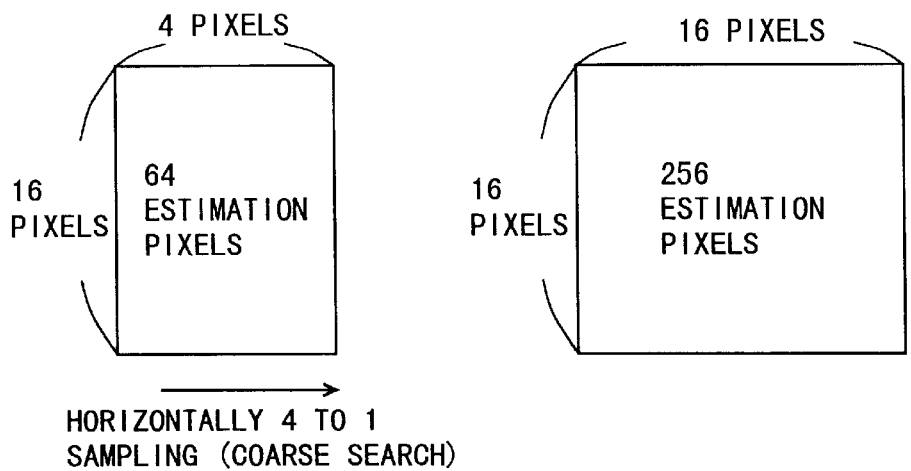
FIG. 11
|  | SA1 | SA2 | SA3 |  |
|---|---|---|---|---|
|  | (H, V) = (4m, n) | (H, V) = (m, n) | (H, V) = (4m, n) | −32 |
|  | −96          −33 | −32          +31 | +32          +95 |  |
|  | COARSE SEARCH | FINE (FULL) SEARCH | COARSE SEARCH | +31 |

| | INPUT SEQUENCE | | | | | CODING SEQUENCE | |
|---|---|---|---|---|---|---|---|
| | (1) | (3) | (4) | (2) | (6) | (7) | (5) |
| CURRENT PICTURE | I1 | B1 | B2 | P2 | B3 | B4 | P3 |

| | #1 | #2 | #3 | #4 | #5 | #6 | #7 |
|---|---|---|---|---|---|---|---|
| CODING | I1 | P2 | B1 | B2 | P3 | B3 | B4 |
| REFERENCE PICTURE MEMORY 1 (41) | I1 → | | | | P3 → | | |
| REFERENCE PICTURE MEMORY 2 (42) | ▨ | P2 → | | | | | |
| NEAR | ▨ | | 1 | 2 | | 2 | 1 |
| FAR | ▨ | | 2 | 1 | | 1 | 2 |

↑ P2 CODING     ↑ P3 CODING

F I G. 2 0
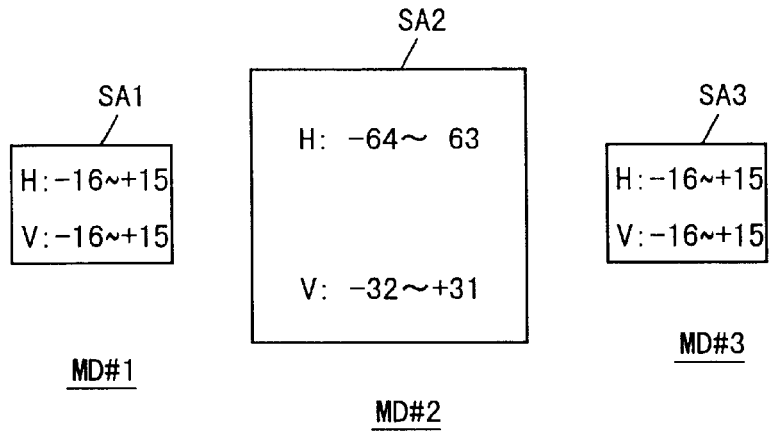
F I G. 2 1
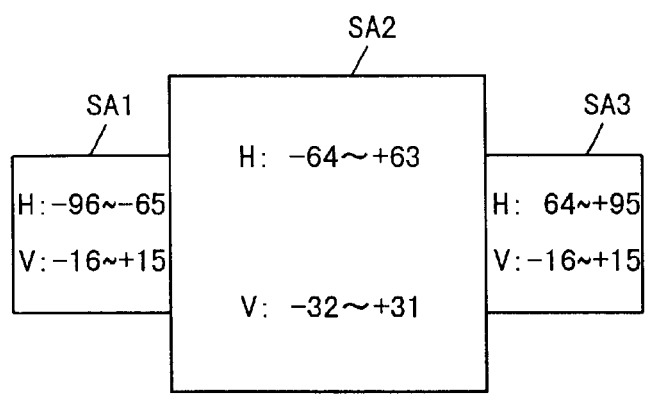
F I G. 2 2
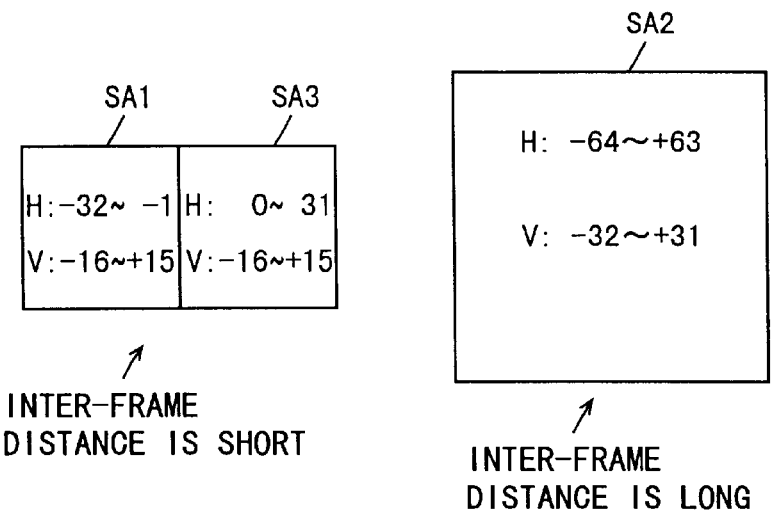

F I G. 35
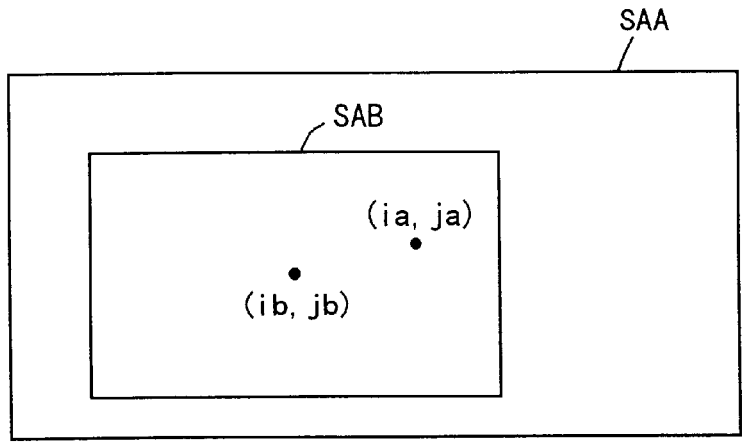
(ia, ja) or (ib, jb) EQUALS (0, 0)
F I G. 36
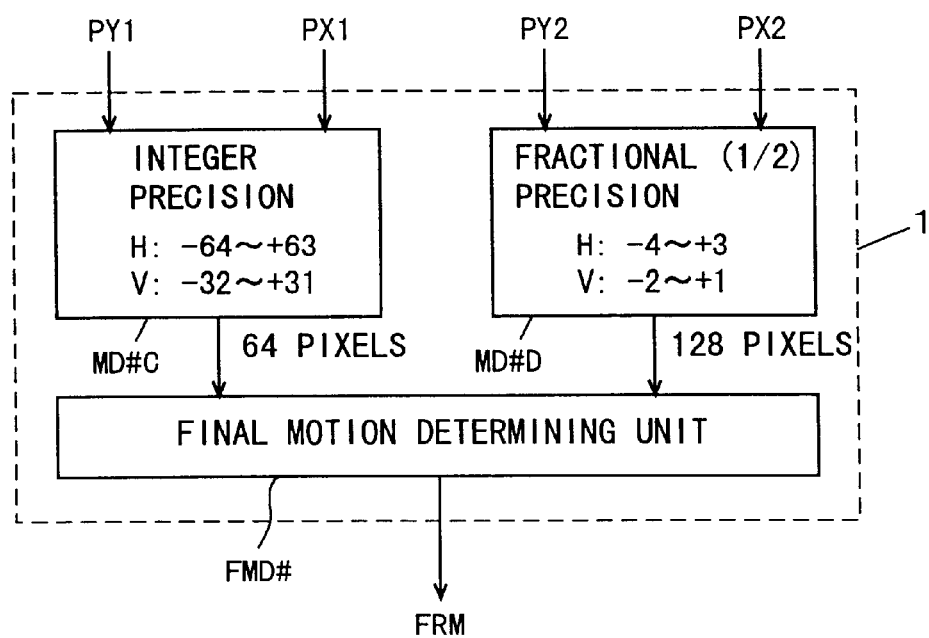

MOTION VECTOR DETECTING APPARATUS

BACKGROUND OF THE INVENTION

1. Field of the Invention

The present invention relates to a motion vector detecting apparatus, and more particularly to a motion vector detecting apparatus used in a digital motion picture compression system.

2. Description of the Background Art

To transmit a huge amount of image data efficiently at high speed, the image data are compressed to reduce the data amount to be transferred. One of such image data compression method is an MPEG method that deals with motion pictures. In this MPEG method, a motion vector is detected on a picture block basis according to a block matching method. This motion vector as well as a difference value between pixels in a current picture block and in a predictive picture block is transmitted. Since the difference value is used as the data to be transmitted, if the predictive picture block and the current picture block are well-consistent (i.e., if the degree of motion is small), the difference value is small, which leads to a reduced amount of data to be transmitted. Conversely, if the predicted picture block and the current picture block are poorly consistent, the data amount to be transmitted will increase.

As the block size decreases, precision in detection will increase, but resultant transmission data amount will increase. Typically, in the block matching method in the MPEG method, a macroblock having a size of 16 pixels by 16 pixels is used as a unit block for motion vector detection. In the MPEG method, picture data are transmitted on a frame basis, each frame consisting of a plurality of macroblocks.

FIG. 42 schematically shows a construction of a divided display screen according to the block matching method. In FIG. 42, one picture IG is divided into a plurality of macroblocks MB. By way of example, FIG. 42 shows the picture that is divided into macroblocks of 4 rows by 5 columns. Macroblock MB generally has a size of 16 pixels by 16 pixels, and the number of macroblocks MB included in one picture IG is determined appropriately dependent on the number of pixels constituting picture IG.

FIG. 43 illustrates a motion vector detecting operation according to the block matching method. In FIG. 43, a search area SE having a prescribed size is determined for a current picture block CB of a target for the motion vector detection. This search area SE has a size that is predetermined both horizontally and vertically with its center being a position of macroblock (or, a template block) MB included in picture IG shown in FIG. 42. In this search area SE, from a position (a real rear point) corresponding to the position of current picture block CB, a positional vector (i, j) of a reference picture block RB included in search area SE is calculated and determined as a motion vector candidate. The correlation between current picture block CB and reference picture block RB is obtained. Typically, a sum of absolute difference values or squared difference values between pixels at corresponding positions in current picture block CB and in reference picture block RB is obtained as an estimation value. This estimation value is obtained for every positional vector in search area SE, and the displacement vector of the reference picture block having the smallest estimation value is determined as a motion vector for the current picture block CB.

When pixel data of current picture block CB is expressed as "aij" and pixel data of reference picture block RB as "bij", the estimation value is calculated from the following equation:

$$E=\Sigma|aij-bij|,$$

$$\text{or } E=(\Sigma aij^2-bij^2)$$

Thus, a huge number of calculations are necessary to obtain the estimation value. Moreover, after obtaining the estimation value for every reference block RB in search area SE, the motion vector should be determined, for which another huge number of calculations are required. To perform this motion vector detection at high speed, a variety of operation algorithms have been proposed. Operation algorithms in the motion picture compression system according to the MPEG method are described in the following articles.

P. Pirsch et al., "VLSI Architecture for Video Compression—A Survey", Proc. IEEE Vol. 83, No. 2, pp.220–246, 1995.

M. Yoshimoto et al., "ULSI Realization of MPEG2 Real-time Video Encoder and Decoder—An Overview", IEICE Trans. Electron., Vol. E78-C, No. 12, pp.1668–1681, 1995.

Tanaka et al., "MPEG2 Encoding LSIs About To Change Audiovisual Equipment For Household Use", Nikkei Electronics, No. 711, Mar. 9, 1998.

LSIs for motion detecting operations designed to detect motion vectors at high speed are described in the following articles.

K. Ishihara et al., "A-Half-Pel Precision MPEG2 Motion Estimation Processor with Concurrent Three-Vector Search", ISSCC Digest of Technical Papers, pp.288–289, 1995.

A. Ohtani et al., "A Motion Estimation Processor for MPEG2 Video Real Time Encoding at Wide Search Range", Proc. IEEE Custom Integrated Circuits Conference, pp.405–408, 1995.

A. Hanami et al., "A 165-GOPS Motion Estimation Processor with Adaptive Dual-Array Architecture for High Quality Video-Encoding Applications", Proc. IEEE Custom Integrated Circuits Conference, pp.169–172, 1998.

An all-sample full-search method enables the most accurate motion vector detection, in which method the above-described estimation values are calculated for all motion vector candidates within a search area. Specifically, an estimation value is obtained by calculating differences for all the pixel data in a picture block under search (i.e., a template block) and in a reference picture block. A positional vector of the reference picture block having the minimal estimation value among the estimation values estimated for all the estimation points in the search area is determined as a motion vector.

This all-sample full-search method, however, requires a huge amount of calculations and takes a long time to determine the motion vector. Thus, for high-speed motion vector detection through reduction of the computational amount, it is required to narrow the search area to reduce the number of estimation points. This means that, when a motion vector detecting apparatus is implemented with a single LSI, it is necessary to narrow a motion vector search range of this motion vector detecting apparatus of one LSI. Consequently, in order to search a motion vector over a wide range according to the all-sample full-search method, a plurality of LSIs (motion vector detecting apparatuses) should be operated in parallel. This leads to an increased number of LSIs to be used, resulting in an increase in power consumption as well as in apparatus scale.

To reduce the amount of computation in the all-sample full-search method, a variety of approaches have been proposed as follow: a sub-sampling approach, in which the differential operation is performed for only data of a part of pixels at each searching position (for each motion vector candidate, or at each estimation point); an algorithmic searching approach, in which the differential operation between a template block and a reference picture block is performed at only a part of coordinate positions in a search area according to a specific algorithm; and a combination of the sub-sampling approach and the algorithmic searching approach. A motion picture compression apparatus with a motion vector detecting circuit using the combined approach of sub-sampling and algorithmic searching is described, for example, in the following article.

M. Mizuno et al., "A 1.5 W Single-Chip MPEG2 MP@ML Encoder with Low-Power Motion Estimation and Clocking", ISSCC Digest of Technical Papers, pp. 256–257, 1997.

In these motion vector searching approaches, however, a size of search area (motion vector search range) is fixed, and the motion vector is searched according to an algorithm that is statically determined independent of the characteristics of input current picture data. Therefore, such a situation may arise that, for some current picture data, it is possible to detect a motion vector having an estimation value substantially equal to that obtained using the all-sample full-search method, but for other current picture data, a motion vector having an estimation value considerably greater than that derived by the all-sample full-search method is detected, thereby hindering efficient data compression. In the MPEG method, a current picture is coded using one of the following coding schemes: intra-frame (or intra-field) predictive coding; unidirectional predictive coding in which a picture is predicted from a picture preceding in time; and bi-directional predictive coding in which a predictive picture is created using two pictures preceding and succeeding in time.

FIG. 44 shows an example of a sequence of pictures. In the MPEG method, a picture is formed of a frame or a field. Kinds of the pictures include: an I picture, which is a reference frame and in which intra-frame (intra-field) prediction is performed; a B picture which is predicted using two pictures preceding and succeeding in time; and a P picture which is predicted using a past picture. I picture is inserted every prescribed number of frames (or fields). P picture is inserted every three pictures. Among them, B pictures are inserted. In FIG. 44, I picture 401, B pictures 402 and 403, P picture 404, and B pictures 405 and 406 are illustrated. The numbers given below I, B and P indicating the characteristics of respective pictures indicate their orders in time.

For prediction of B picture 402, predictions 411 and 412 are performed. Prediction 411 is performed using I picture 401 preceding in time, and prediction 412 is performed using P picture 404 succeeding in time. B pictures are not used for prediction. Prediction 413 for P picture 404 is performed using I picture 401 preceding in time.

Between B picture 402 and P picture 404 there exists B picture 403. Therefore, the time difference (hereinafter, referred to as an "inter-frame distance") between B picture 402 and I picture 401 is not the same as that between P picture 404 and B picture 402. As the inter-frame distance is larger, the degree of motion increases. Thus, it is necessary to set a prediction range as large as possible. This means that a wider search range is required for detecting the motion vector. Conversely, if the inter-frame distance is small, the degree of motion is small, and thus, an optimal motion vector can be detected using a small prediction range. Accordingly, in the case of the P picture having a long inter-frame distance for unidirectional prediction 413, it is necessary to set a search area as large as possible. On the contrary, in the case of forward (or backward) prediction in bi-directional prediction 411 or 412, it is desirable that the search area is determined taking the inter-frame distance into consideration to be allocated to each respective reference picture.

Conventionally, however, motion vector detection has been performed in a fixed manner, without taking into consideration the inter-frame distance at the time of prediction. This causes a problem that an unnecessarily large or too narrow search area is set for a current picture of a search target, which makes the motion vector detection inefficient and inaccurate.

SUMMARY OF THE INVENTION

An object of the present invention is to provide a motion vector detecting apparatus that enables efficient motion vector detection in both unidirectional and bi-directional predictions, without increasing an amount of hardware.

Another object of the present invention is to provide a motion vector detecting apparatus that improves the ratio between efficiency in motion vector detection and the amount of hardware, for both unidirectional and bi-directional predictions.

A motion vector detecting apparatus according to the present invention includes a plurality of motion vector detecting units that receive template block pixel data and search area pixel data and perform a prescribed operational process according to a block matching method to detect a motion vector for the template block according to the results of process. The plurality of motion vector detecting units include motion vector detecting units different in either or both of template block size and search area size. The template block size indicates the number of pixels to be used for motion vector estimation among the pixels in a macroblock, where the macroblock is a unit for the process according to the block matching method. The search area size represents a motion vector search range.

The motion vector detecting apparatus according to the present invention further includes: a control circuit that sets search areas for the plurality of motion vector detecting units so that the search area for the plurality of motion vector detecting units as a whole in a reference picture is varied according to characteristics of a current picture including the template block pixels; and a motion vector determining circuit that receives motion vector data from the plurality of motion vector detecting units to determine a final motion vector for the template block.

Since the search area for the plurality of motion vector detecting units as a whole is allowed to vary according to the characteristics (or the type of predictive coding) of the current picture of interest, it is possible to optimize a motion vector search range depending on the inter-frame distance. This enables efficient motion vector detection.

Furthermore, since the plurality of detecting units having different template block sizes and/or different search area sizes are used, it is possible to readily change the overall search area size as well as precision in searching. Thus, the motion vector can be detected efficiently, without increasing the amount of hardware.

The foregoing and other objects, features, aspects and advantages of the present invention will become more

BRIEF DESCRIPTION OF THE DRAWINGS

FIG. 3 is a diagram schematically showing a configuration of a calculating unit shown in FIG. 2.

FIG. 4 is a diagram schematically showing a configuration of an element processor included in a column of element processors shown in FIG. 3.

FIG. 9A shows a template block size and FIG. 9B shows a macroblock size in the case where the number of estimation pixels is 64.

FIGS. 10A and 10B schematically show configurations of search window blocks in the case where the number of estimation pixels are 64 and 256, respectively.

FIG. 11 schematically illustrates search area allocation for a unidirectionally predictive picture according to the second embodiment of the present invention.

FIG. 20 schematically illustrates search area allocation for a motion vector detecting apparatus according to a third embodiment of the present invention.

FIG. 21 schematically illustrates search area allocation for a unidirectionally predictive picture according to the third embodiment.

FIG. 22 schematically illustrates search area allocation for a bi-directionally predictive picture according to the third embodiment.

FIG. 35 schematically illustrates search area allocation for a motion vector detecting apparatus according to a seventh embodiment of the present invention, upon coding of a unidirectionally predictive picture.

FIG. 36 is a diagram schematically showing a configuration of a motion vector detecting apparatus according to an eighth embodiment of the present invention.

DESCRIPTION OF THE PREFERRED EMBODIMENTS

First Embodiment

Figure 1:
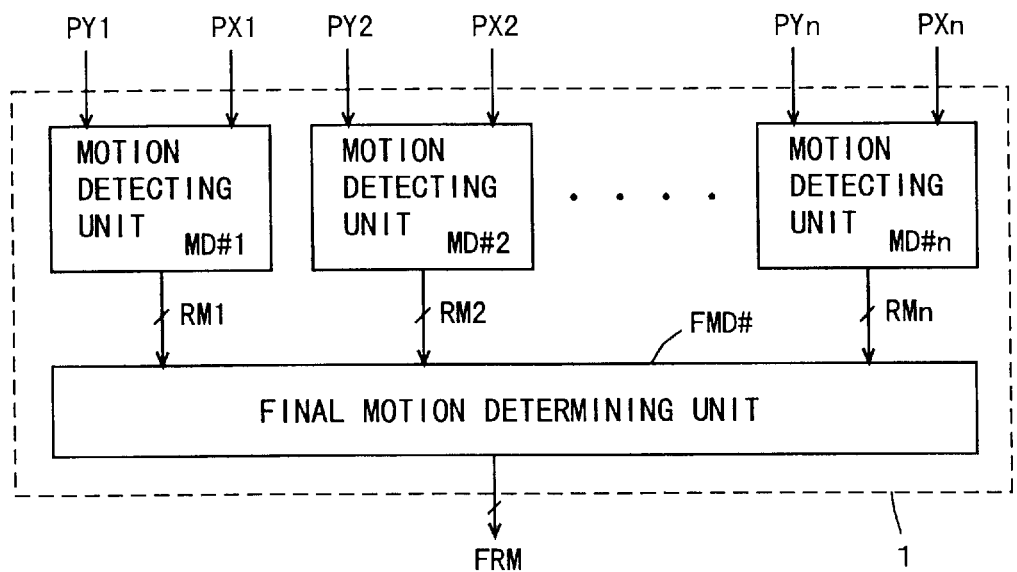
FIG. 1 is a diagram schematically showing an entire configuration of a motion vector detecting apparatus according to a first embodiment of the present invention.

FIG. 1 is a diagram schematically showing an entire configuration of a motion vector detecting apparatus according to the first embodiment of the present invention. In FIG. 1, a motion vector detecting apparatus 1 includes: a plurality of (n) motion detecting units MD#1–MD#n provided in parallel with one another to detect motion vectors; and a final motion determining unit FMD# receiving detection results RM1–RMn in parallel from motion detecting units MD#1–MD#n to generate a final result FRM for a template block. For detection results RM1–RMn generated from motion detecting units MD#1–MD#n, motion vectors and estimation values may be output according to a plurality of prediction methods in some motion vector detection modes. For example, in the case of frame prediction, motion vectors are generated for three categories; for a frame macroblock, for a top field block, and for a bottom field block.

For the final detection result FRM generated from final motion determining unit FMD#, a plurality of motion vectors may be output in parallel for respective predictive coding methods, or, one optimal, final motion vector may be generated from a plurality of detection results, dependent on an applied system.

Figure 2:
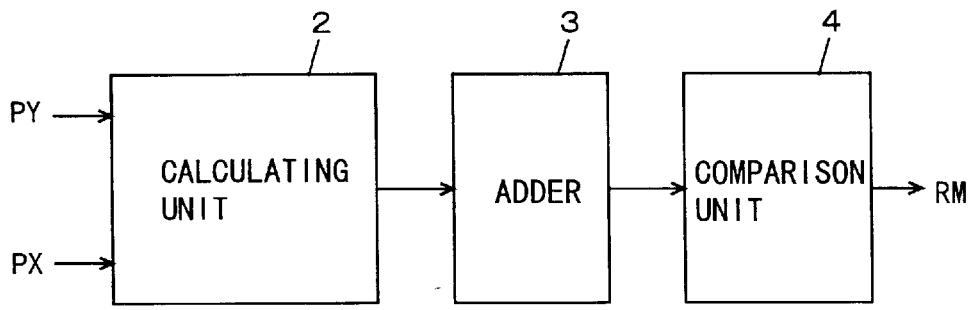
FIG. 2 is a diagram schematically showing a configuration of a motion detecting unit shown in FIG. 1.

FIG. 2 schematically shows a configuration of motion detecting units MD#1–MD#n shown in FIG. 1. In FIG. 2, a configuration of motion detecting unit MD# is shown representatively. Motion detecting unit MD# in FIG. 2 includes a calculating unit 2 that receives template block pixel data PX and search window pixel data PY to perform a prescribed calculation. This calculating unit 2 includes element processors arranged corresponding to pixels in a template block (one to one correspondence is not particularly required). The element processors each calculate and output absolute difference values between corresponding template block pixel data and corresponding search window block pixel data in parallel, for example. Here, the template block represents a macroblock that is included in a current picture and is to be a target of the motion vector searching.

Motion detecting unit MD# further includes an adder 3 that adds estimation value components (e.g., absolute difference values) output in parallel from calculating unit 2, and a comparison unit 4 that receives the sum from adder 3 for comparison with a sum obtained in a past cycle, and determines a positional vector of a search window block giving the minimum sum to be a motion vector candidate. Detection result RM is output from comparison unit 4.

FIG. 3 is a diagram schematically showing a configuration of calculating unit 2 shown in FIG. 2. In FIG. 3, calculating unit 2 includes columns PEL#0–PEL#n of element processors disposed corresponding to columns of pixels (vertically aligned pixel columns) in the template block, and delay buffers DL#0–DL#n disposed corresponding to the columns of element processors PEL#0–PEL#n.

Delay buffers DL#0–DL#n transmit data for one pixel in each estimation value calculating cycle to corresponding columns of element processor columns PEL#0–PEL#n. Each of delay buffers DL#0–DL#n has a first-in first-out arrangement, and provides a delay time corresponding to the number of stages included therein.

Element processor columns PEL#0–PEL#n transfer, in one direction, search window pixel data received from corresponding delay buffers DL#0–DL#n. Search window pixel data shifted out from columns of element processors PEL#0–PEL#n are sent to delay buffers DL#1–DL#n disposed adjacent in their upstream sides. From the column of element processors PEL#n, the search window pixel data are shifted out pixel by pixel every time the operation for calculating an evaluation value is completed. On the other hand, new search window pixel data PY are input to delay buffer DL#0 pixel by pixel.

In addition, template block pixel data PX are provided to respective columns of element processors PEL#0–PEL#n. Thus, in the columns of element processors PEL#0–PEL#n, the template block pixels reside all the time, whereas the search window pixels are shifted one pixel by one pixel.

FIG. 4 is a diagram showing an exemplary configuration of an element processor included in the columns of element processors PEL#0–PEL#n. In FIG. 4, the element processor PE includes: a register circuit 5a that takes in search window pixel data PY according to a clock signal CLK for transmission to an element processor at the next stage; a register circuit 5b that stores corresponding template block pixel data PX; and an absolute difference value circuit 5c that calculates and outputs an absolute difference value |PX-PY| between the pixel data from register circuits 5a and 5b.

Element processor PE may be configured to contain a plurality of registers 5a and a plurality of registers 5b and to calculate the absolute difference values for a plurality of template block pixels in a time division multiplex manner by absolute difference value circuit 5c. Here, for simplicity, element processor PE is shown storing one pixel of template block pixel data and one pixel of search window pixel data.

Figure 5:
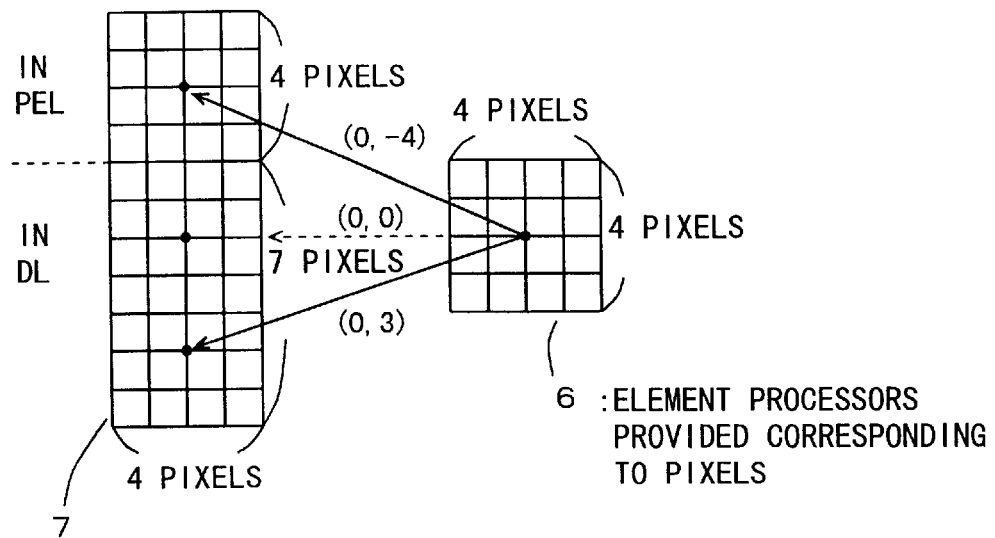
FIG. 5 is a diagram illustrating search window pixel data and template block pixel data stored in the calculating unit shown in FIG. 3.

FIG. 5 illustrates the motion vector detecting operation. In FIG. 5, a template block 6 consists of 4 pixels by 4 pixels. Now, assume that the search range in a vertical direction is −4 to +3. A search window 7 includes all the pixels included in the search range in the vertical direction. In this case, search window 7 has a size of 11 pixel rows by 4 pixel columns. In this search window 7 at its initial state, the pixels in the top 4 rows by 4 columns are stored in the columns of element processors PEL#0–PEL#n. Here, n=3. The columns of element processors PEL#0–PEL#n correspond to respective pixel columns. Thus, each of the columns of element processors PEL#0–PEL#n store data of four pixels aligned in a vertical direction. The remaining pixel data in 7 rows by 4 columns are stored in delay buffers DL#0–DL#n (n=4), with each pixel column of search window 7 corresponding to each delay buffer DL#0–DL#n (n=4).

Therefore, at the initial state, pixel data of a positional vector (0, −4) in a search window are stored in the columns of element processors. In this state, absolute difference values between the pixels in template block 6 and corresponding pixels in the corresponding search window block are calculated as estimation value components. These absolute difference values are sent in parallel from absolute difference value circuit 5c in FIG. 4 to adder 3 in FIG. 2, and an estimation value is calculated. The calculated estimation value is sent to comparison unit 4.

Figure 6A:
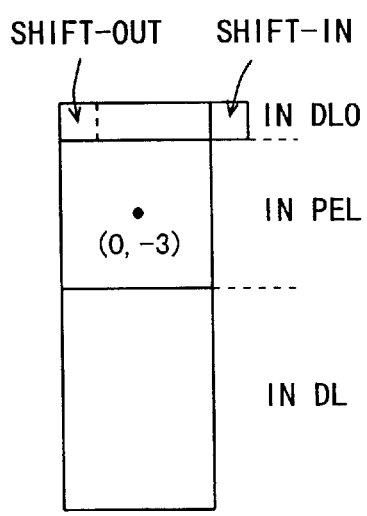
FIGS. 6A and 6B are diagrams illustrating operation of the calculating unit shown in FIG. 3.

When the calculation of this estimation value is completed, search window pixel data for one pixel is shifted in from an outside. According to this shifting operation, a shift of search window pixel data by one pixel is performed in each of delay buffers DL#0–DL#n and each of columns of element processors PEL#0–PEL#n. This shifting operation is always in one direction, and as a result, pixel data of one pixel at the upper left corner of search window 7 is shifted out, as shown in FIG. 6A.

Figure 6B:
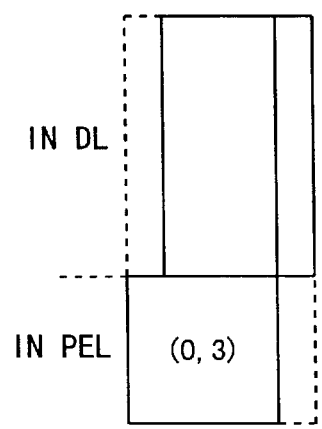

Since the search window pixel data are all shifted by one pixel while the pixel data of template block 6 reside in the columns of element processors PEL#0–PEL#n, the columns of element processors PEL#0–PEL#n now store pixel data in a search window block of a positional vector (0, −3). Next, in a similar manner, each absolute difference value is calculated in each element processor PE in the columns of element processors to obtain an estimation value. When the calculation of the estimation value is completed, the shifting-in operation of search window pixel data PY is performed again. This operation is repeated seven times in total, so that the search window block is moved to the bottom of the search window 7, as shown in FIG. 6B. The positional vector of this search window block is (0, 3). After calculating the estimation value for this positional vector (0, 3), three pixels in the search window pixel data are consecutively shifted in, and thus, the next search window is formed.

This state is the same as that shown in FIG. 5, and is ready for the calculation of an estimation value for the next horizontal vector component. In the configuration of calculating unit 2 shown in FIG. 3, the search range in the vertical direction is determined according to the lengths of the column of element processor PEL#i and its corresponding delay buffer DL#i. The motion vector is detected by repeating the operation shown in FIGS. 5, 6A and 6B, through the entire search range in the horizontal direction. In this case, the search window pixel data are simply shifted in and out at each operation cycle, and it is unnecessary to load the template block pixel data. In addition, since the estimation value components of the template block pixels and corresponding search window block pixels are calculated in parallel, a high-speed operational process is accomplished.

In this motion detecting unit, the comparison unit detects a motion vector based on the estimation values received in a predetermined number of operation cycles. As the number of estimation points (positional vectors in the search window block) increases, so does the number of operation cycles, and in response, the time required for motion vector detection is lengthened. Basically in the present invention, the motion detecting units are used adaptively based on the characteristics of a current picture including the template block.

Figure 7A:
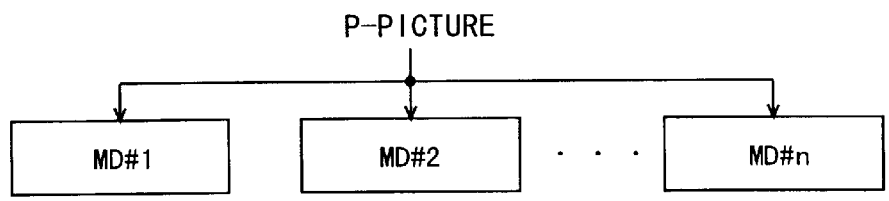
FIGS. 7A and 7B illustrate adaptive use of the motion detecting units according to the first embodiment of the present invention.

FIG. 7A illustrates allocation of the motion detecting units in the case where the picture of interest is a P picture or a unidirectionally predictive picture. When the picture of a motion vector searching target is a unidirectionally predictive picture (P picture), the motion vector detection is performed in an effectively wide range of search area, using all the motion detecting units MD#1–MD#n.

Figure 7B:
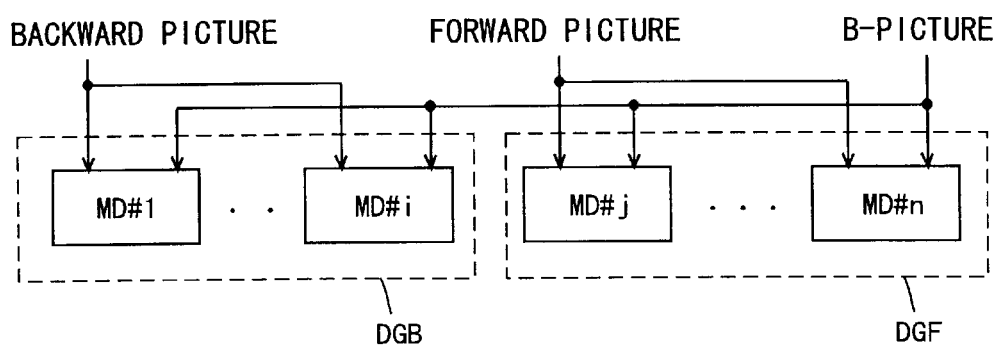

Conversely, if the picture of interest is a bi-directionally predictive picture (B picture), motion detecting units MD#1–MD#n are divided into two groups DGB and DGF, as shown in FIG. 7B. The number of the motion detecting units included in each of groups DGB, DGF is determined appropriately depending on a system configuration. To motion detecting units MD#1–MD#i included in group DGB, a backward picture succeeding the B picture in time is allocated, and motion detecting units MD#j–MD#n included in group DGF, a forward picture preceding the B picture in time is allocated. Forward prediction and backward prediction are performed in parallel in groups DGF and DGB, and high-speed bi-directional prediction is accomplished. Furthermore, since the forward picture and the backward picture have different inter-frame distances with respect to the B picture, search areas for groups DGF and DGB may be adapted to differ in range and/or location from each other, taking the inter-frame distances into consideration. Thus, motion vector searching can be performed more effectively.

The motion detecting units MD#1–MD#n can be used adaptively depending on the characteristics of the picture to be searched, and the search area as well as the search precision can be optimized for both the unidirectional and bi-directional predictions. Therefore, the amount of hardware of motion detecting units MD#1–MD#n can also be optimized.

Meanwhile, for the bi-directionally predictive picture, motion vectors for the forward and backward pictures are output in parallel from the final motion determining unit.

Second Embodiment

Figure 8:
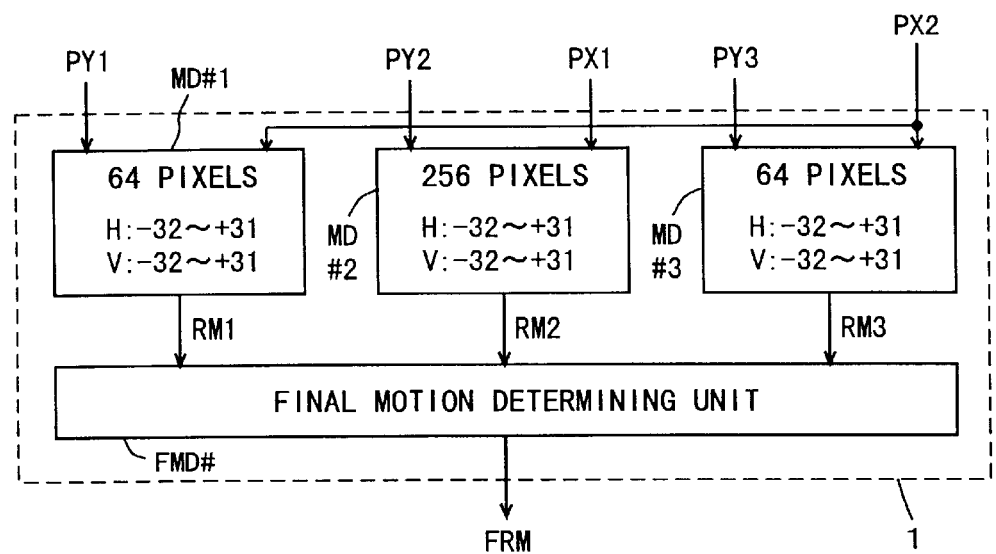
FIG. 8 is a diagram schematically showing a configuration of a motion vector detecting apparatus according to a second embodiment of the present invention.

FIG. 8 is a diagram schematically showing an entire configuration of a motion vector detecting apparatus according to the second embodiment of the present invention. The motion vector detecting apparatus in FIG. 8 includes three motion detecting units MD#1–MD#3. Motion detecting units MD#1 and MD#3 each use 64 pixels as the estimation pixels, and motion detecting unit MD#2 uses 256 pixels as the estimation pixels. Search areas specific to respective motion detecting units MD#1–MD#3 are each set from −32 to +31 in a horizontal direction (H) and from −32 to +31 in the vertical direction (V).

Motion detecting units MD#1–MD#3 include element processors disposed corresponding to respective estimation pixels as shown in FIGS. 9A and 9B. FIG. 9A shows a template block size of motion detecting units MD#1 and MD#3, and FIG. 9B shows a macroblock size. In motion detecting units MD#1 and MD#3, the template block size is differentiated from the macroblock size. If motion detecting units MD#1–MD#3 have the same size of search areas specific thereto, they have search windows of the same size stored in the calculating units included therein. When their specific search areas are of equal size, and if they operate at the same frequency, the numbers of their estimation pixels are proportional to the numbers of operational components (element processors) constituting the respective motion detecting units, or, the amount of hardware. Therefore, the amount of hardware of each of motion detecting units MD#1 and MD#3 is one fourth that of motion detecting unit MD#2.

FIGS. 10A and 10B schematically show configurations of search window blocks for motion detecting units MD#1–MD#3 shown in FIG. 8. Here, search window blocks of the size same as the template blocks are used to calculate the estimation values.

As shown in FIG. 10A, for motion detecting units MD#1 and MD#3 each having 64 estimation pixels, the template block and the search window block are each constructed with 16 pixel rows and 4 pixel columns. In contrast, as shown in FIG. 10B, for motion detecting unit MD#2 having 256 estimation pixels, the template block and the search window block are each constructed with 16 pixel rows and 16 pixel columns. As shown in FIG. 9B, macroblock MB consists of 16 pixels by 16 pixels. Thus, in the template block with 64 estimation pixels, one pixel for four pixels is extracted in a horizontal direction, or, 4 to 1 sub-sampling is performed. When coarse search is performed, the search window is also sub-sampled in the horizontal direction. In the case of full search, all the estimation points in the search area are utilized.

FIG. 11 illustrates search area allocation for motion detecting units MD#1–MD#3 in the case where a picture of interest is a unidirectionally predictive picture (P picture). In FIG. 11, the search area SA1 for motion detecting unit MD#1 has a horizontal range from −96 to −33. Search area SA2 for motion detecting unit MD#2 has a horizontal range from −32 to +31 allocated thereto. Search area SA3 for motion detecting unit MD#3 has a horizontal range from +32 to +95 allocated thereto. These search areas SA1–SA3 all have vertically the same search range from −32 to +31.

In search areas SA1 and SA3, coarse search is performed by sub-sampling the estimation points. On the other hand, in search area SA2, fine (full) search is performed in which all the estimation points are used upon calculation of an estimation value. In this case, since each sub-search area (i.e., each search area allocated to each motion detecting unit) does not overlap with one another, the entire search area for the template block has a horizontal range from −96 to +95, allowing a motion vector to be searched over a wide area. In the central region of the entire search area, fine search is performed, so that the estimation values can be calculated accurately. As described above, full search (or fine search) is performed in search area SA2 where the motion vector is very likely to exist, while coarse search is performed in search areas SA1 and SA3 where the possibility that the motion vector will exist is small. This enables efficient motion vector search for a P picture having a large degree of motion and a long inter-frame distance.

Figure 12:
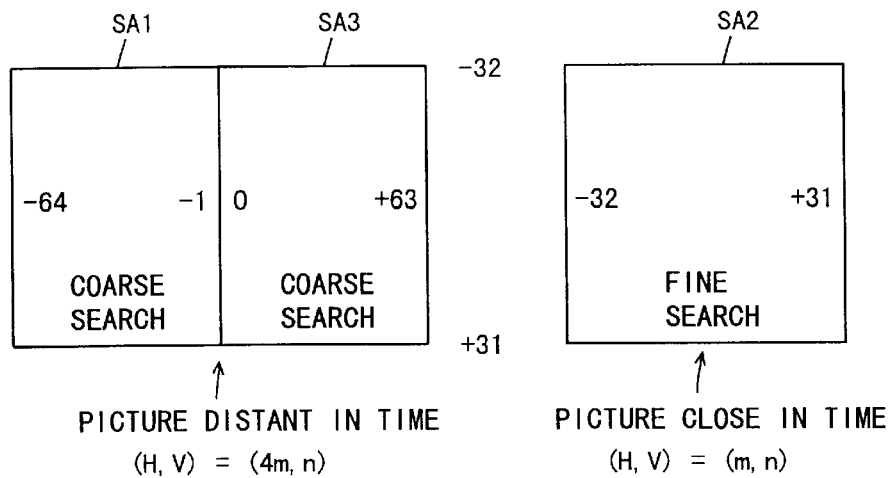
FIG. 12 schematically illustrates search area allocation for coding of a bi-directionally predictive picture according to the second embodiment.

FIG. 12 shows search area allocation for the motion detecting units in the case where a picture of interest is a bi-directionally predictive picture (B picture). As shown in FIG. 12, search areas SA1 and SA3 for motion detecting units MD#1 and MD#3 are used in combination, whereas search area SA2 for motion detecting unit MD#2 is used singly. To search area SA1 of motion detecting unit MD#1, a motion vector search range horizontally from −64 to −1 is allocated. To search area SA3, the search range horizontally from 0 to +63 is allocated. To search area SA2 of motion detecting unit MD#2, a motion vector search range horizontally from −32 to +31 is allocated. Search areas SA1 and SA3 are used to detect a motion vector for a reference picture more distant in time. When the picture is distant in time, a large degree of motion is expected, and thus, a motion vector is searched over a wide area. In contrast, search area SA2 is used to detect a motion vector for a reference picture that is closer in time. If the picture is close in time, the degree of motion is small, so that the motion vector is searched according to the fine search method within a relatively narrow search area. Search areas SA1 and SA3 each have a wide range, and coarse search is performed therein. Note that all the search areas SA1, SA2 and SA3 have vertically the same motion vector search range from −32 to +31.

As shown in FIG. 12, in the case of a bi-directionally predictive picture, search areas for two pictures can be set according to their time differences from a current picture, or their inter-frame distances. Therefore, the motion vector search range can be set according to the degree of motion, and thus, the motion vector can be detected efficiently and accurately.

Figure 13:
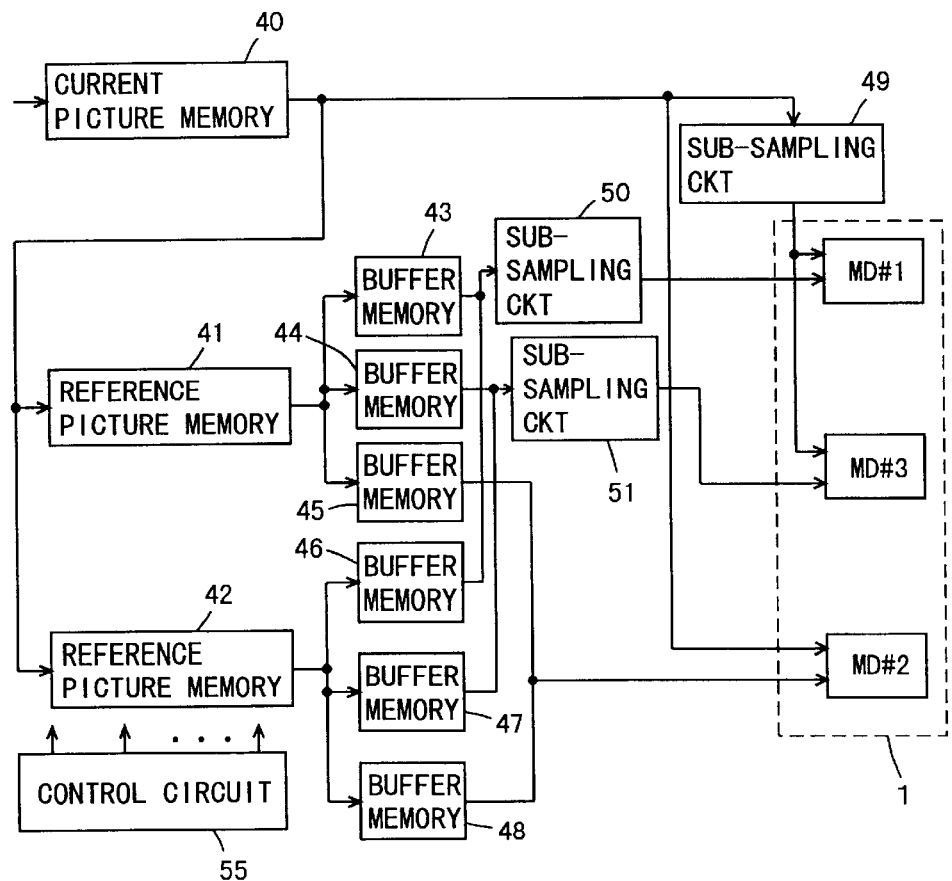
FIG. 13 is a diagram schematically showing a configuration of a control unit for the motion vector detecting apparatus according to the second embodiment of the present invention.

FIG. 13 schematically shows a configuration of a motion vector detecting system. In FIG. 13, the motion vector detecting system includes: a current picture memory 40 that stores pixel data of the current picture, buffers the picture data to be coded and changes the sequence of pictures between the input and the output; reference picture memories 41 and 42 that store pixel data from current picture memory 40 when the current picture stored in current picture memory 40 is an I picture or a P picture; buffer memories 43, 44 and 45 that store search window pixel data from reference picture memory 41; buffer memories 46, 47 and 48 that store search window pixel data read out from reference picture memory 42; a sub-sampling circuit 49 that sub-samples template block pixel data read out from current picture memory 40; a sub-sampling circuit 50 that sub-samples search window pixel data read out from either one of buffer memories 43 and 46; and a sub-sampling circuit 51 that sub-samples data read out from either one of buffer memories 44 and 47.

Buffer memories 43 to 48 each is set at an output high impedance state when unselected. The template block pixel data sub-sampled by sub-sampling circuit 49 is provided to motion detecting units MD#1 and MD#3 included in motion vector detecting apparatus 1. The template block pixel data read out from current picture memory 40 is supplied to motion detecting unit MD#2. The sub-sampled search window pixel data from sub-sampling circuit 50 is provided to motion detecting unit MD#1, and the sub-sampled search window pixel data from sub-sampling circuit 51 is provided to motion detecting unit MD#3. Sub-sampling circuit 49 performs 4 to 1 sub-sampling in a horizontal direction to generate one pixel per four pixels. Sub-sampling rates of sub-sampling circuits 50 and 51 may also be 1/4, or, they can be any other rate.

A control circuit 55 is provided to control reading and writing of pixel data. Now, an operation of the motion vector detecting system shown in FIG. 13 will be described in brief.

From current picture memory 40, template block pixel data are read out in a raster scan order. Sub-sampling circuit 49 performs the 4 to 1 sub-sampling operation on the pixel data received, and generates one pixel for each four pixels in a horizontal direction. In this sub-sampling operation, the one pixel may be generated by applying an operational process to four pixels (to generate an arithmetic average value or weighted mean value, for example), or, one pixel of data in a specific location may simply be selected out of the four pixels. What is needed is to generate one pixel per four pixels in the horizontal direction. The template block pixel data from sub-sampling circuit 49 are sent to motion detecting units MD#1 and MD#3 included in motion vector detecting apparatus 1. Thus, motion detecting units MD#1 and MD#3 each store template block pixel data of the size of 4 pixels in a horizontal direction and 16 pixels in a vertical direction. Pixel data read out from current picture memory 40 are stored in motion detecting unit MD#2. Thus, motion detecting unit MD#2 stores template block pixel data of the size of 16 pixels by 16 pixels.

Figure 14:
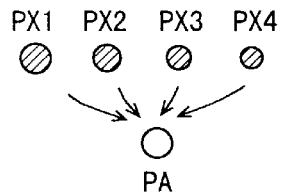
FIG. 14 illustrates operation of a sub-sampling circuit shown in FIG. 13.

At the time of writing of the template block pixel data, as shown in FIG. 14, one pixel PA has been formed from four pixels PX1–PX4 by sub-sampling circuit 49. Thus, a writing rate (frequency) of template block pixel data in motion detecting units MD#1 and MD#3 is one fourth that in motion detecting unit MD#2.

Pictures are written alternately into reference picture memories 41 and 42 on a picture basis. In the case where the pixel data stored in current picture memory 40 is pixel data of a bi-directionally predictive picture (B picture), no picture is stored into reference picture memory 41 or 42. Thus, pictures stored into reference picture memories 41 and 42 are unidirectionally predictive pictures (P pictures) or intra-frame (or intra-field) predictive pictures (I pictures).

Figure 44:
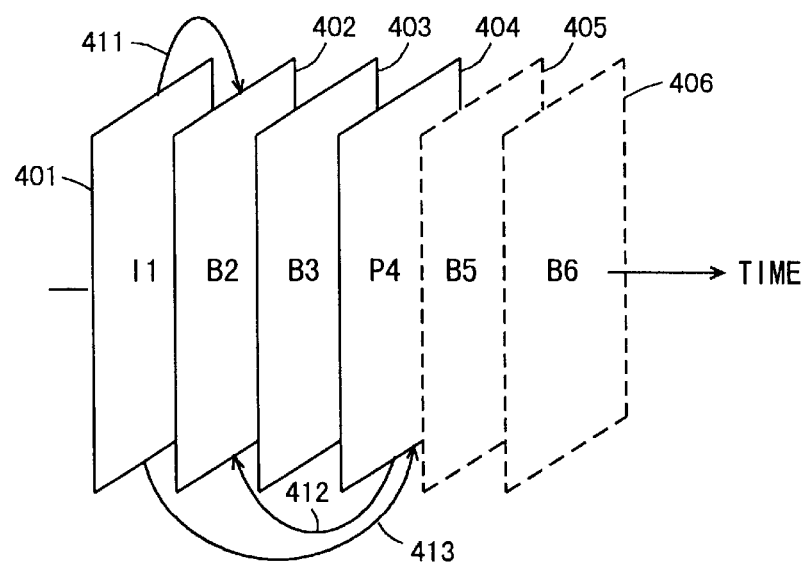
FIG. 44 is a diagram schematically showing a picture coding sequence according to the MPEG method.

When the current picture is a unidirectionally predictive picture (P picture), the pixel data from reference picture memory 41 whichever has data written later are employed. If the current picture is a bi-directionally predictive picture (B picture), both reference picture memories 41 and 42 are used. Which of the reference pictures stored in reference picture memories 41 and 42 is closer in time with respect to the bi-directionally predictive picture is determined by control circuit 55. In the MPEG method, two consecutive bi-directionally predictive pictures (B pictures) are provided either between I picture and P picture or between two P pictures. Thus, when the first one of the two bi-directionally predictive picture is to be processed, the reference picture that has been written more recently into either reference picture memory 41 or 42 is more distant in time, and when the second one of the bi-directionally predictive pictures is to be processed, the same picture that has been written more recently is closer in time. This is as shown in the picture sequence in FIG. 44 previously described.

After the picture data are once written into reference picture memory 41 in a raster scan order, search area pixel data are read out from the memory 41 in the order of pixels aligned in the vertical direction, to be stored into buffer memories 43–45. Similarly, pixel data are read out from reference picture memory 42 sequentially in the vertical direction on a screen when it is activated. In buffer memories 43–48, pixel data of the search window size are stored. Sub-sampling circuits 50 and 51 each perform sampling operation on received pixel data, at a prescribed sub-sampling rate. Since sub-sampling circuits 50 and 51 received pixel data that are read out from buffer memories 43 and 44, and 46 and 47 along the vertical direction on a screen, sub-sampling circuits 50 and 51 perform sub-sampling operation using pixel data having a delay of a vertical search window size.

Figure 15:
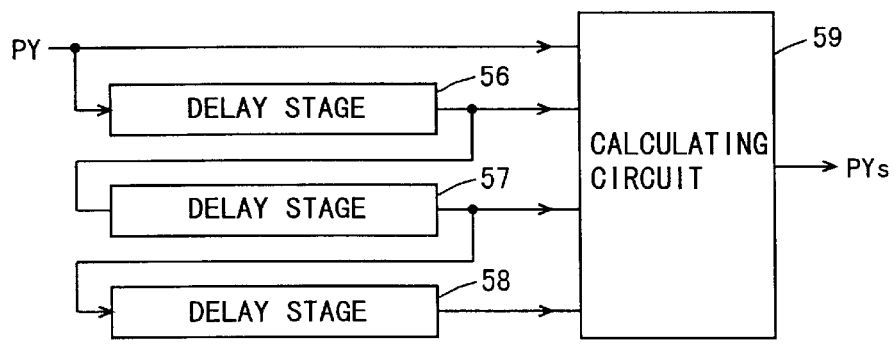
FIG. 15 is a diagram showing an exemplary configuration of the sub-sampling circuit shown in FIG. 13.

FIG. 15 is a diagram showing an exemplary configuration of the buffer memory and sub-sampling circuit. The sub-sampling circuit in FIG. 15 performs horizontally 4 to 1 sub-sampling, and includes: a delay stage 56 that delays received search window pixel data PY (or PX) by a prescribed time period; a delay stage 57 that delays pixel data output from delay stage 56 by a prescribed time period; a delay stage 58 that delays the output pixel data of delay stage 57 by a prescribed time period; and a calculating circuit 59 that performs a prescribed operational process on the input search window pixel data PY (or PX) and to the output pixel data of delay stages 56–58, to output sub-sampled pixel data PYs.

Delay stages 56–58 each is formed of a first-in, first-out memory or a shift register, and delays the received pixel data by a time corresponding to the size of the search block in the vertical direction. The delay time provided by delay stages 56–58 is expressed as 2·r+M cycles, where the template block and the search window block have the vertical size of M rows and the search range has the size of 2·r in the vertical direction.

Figure 16:
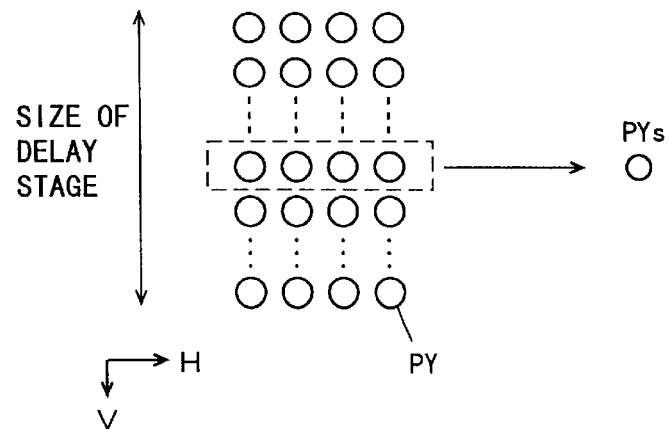
FIG. 16 illustrates operation of a sub-sampling circuit shown in FIG. 15.

As shown in FIG. 16, output from delay stages 56–58 are pixel data that are adjacent to each other horizontally in the search area. Using these horizontally adjacent pixel data, calculating circuit 59 performs the sub-sampling operation to generate sub-sampled pixel data PYs.

Figure 17:
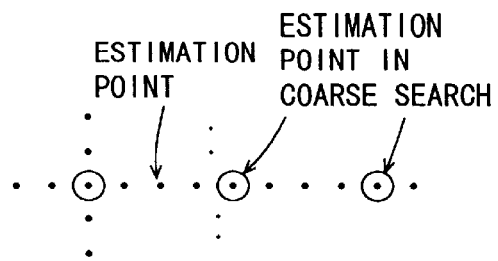
FIG. 17 illustrates distribution of estimation points upon coarse search according to the second embodiment.

By using sub-sampling circuits 50 and 51, buffer memories 43–48 can all be made into the same configuration, and the search window pixel data can all be read out at the same timing. When pixel data are read out sequentially in the vertical direction from reference picture memories 41 and 42, delay stages 56–58 can be used as each of buffer memories 43–48. In any case, motion detecting units MD#1 and MD#3 operate at a one fourth frequency of motion detecting unit MD#2 to calculate estimation values. Thus, even if the number of estimation points in coarse search differ from that in fine search, the operation cycle for calculating a motion vector for one template block can be made the same. This is because, as shown in FIG. 17, in the coarse search operation, estimation values are calculated one for four estimation points in the horizontal direction and for each estimation point in the vertical direction. Other sub-sampling rates may also be used in the search operation.

Figures 18, 19A, 19B:
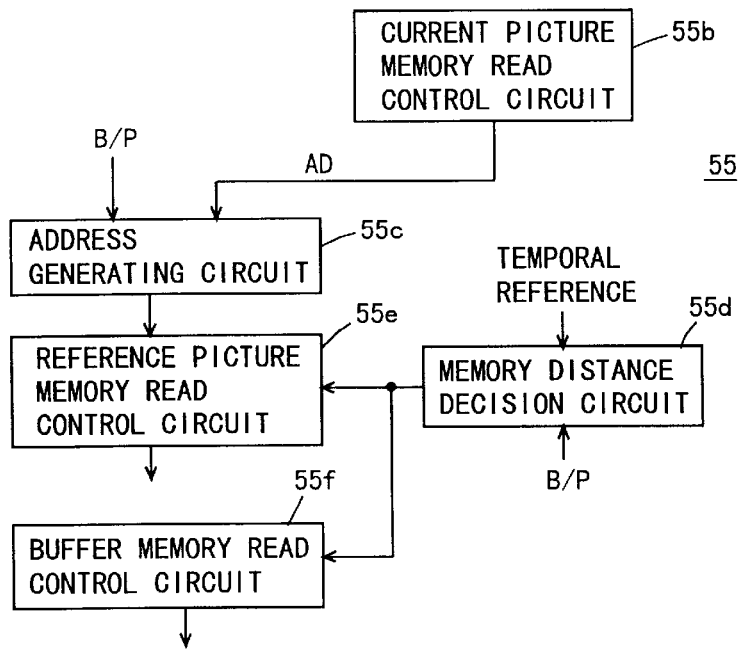
FIG. 18 is a diagram schematically showing a configuration of a control circuit shown in FIG. 13.
FIG. 19A represents an input sequence of pictures.
FIG. 19B is a diagram schematically illustrating the storage of reference pictures in reference picture memories according to the second embodiment.

FIG. 18 schematically shows a configuration of control circuit 55 shown in FIG. 13. In FIG. 18, only a part of control circuit 55 related to reading of pixel data is shown. Pixel data are written into current picture memory 40 sequentially in a raster scan order. For I picture and P picture, the pixel data are written into reference picture memories 41 and 42. The pixel data sequentially read out from the current picture memory only need to be written in the same sequence.

In FIG. 18, control circuit 55 includes: a current picture memory read control circuit 55b that reads out pixel data from current picture memory 40; an address generating circuit 55c that generates an address for the reference picture memory according to a signal B/P instructing whether a picture having pixel data read out from current picture memory 40 is a B picture or a P picture and a template block address AD provided from current picture memory read control circuit 55b; a memory distance decision circuit 55d that judges which of reference picture memory 41 and 42 stores the reference picture data closer in time; a reference picture memory read control circuit 55e that performs pixel data reading for reference picture memories 41 and 42 according to an address signal from address generating circuit 55c and a decision result signal from memory distance decision circuit 55d; and a buffer memory read control circuit 55f that controls reading and writing from and to the buffer memories according to the decision result signal from memory distance decision circuit 55d.

Whether the target picture or the current picture is a B picture or a P picture is determined at an encoder appropriately, and the determined result is placed at a picture header as its picture type. For a P picture, address generating circuit 55c generates to two reference picture memories 41 and 42 an address for a search area, with the template block address AD received from current picture memory read control circuit 55b being its central address (real rear point). Reference picture memory read control circuit 55e sequentially reads out pixel data from reference picture memories 41 and 42 according to the address signal received from address generating circuit 55c. Which reference picture memory is to be accessed according to the address signal received from address generating circuit 55c is determined by memory distance decision circuit 55d.

In the MPEG method, memory distance decision circuit 55d identifies the order of the current picture in the group of pictures (GOP) according to a temporal reference value, and determines which of reference picture memory 41 and 42 stores the pixel data closer in time. Normally, the temporal reference value is placed after a start code of a picture layer and transmitted, and represents the order of the picture within a group of picture GOP.

FIG. 19A shows an input sequence of pictures, and FIG. 19B schematically shows pixel data stored in the reference picture memories. In FIG. 19A, upon transmission, the current picture is transmitted and received in the order of pictures I1, B1, B2, P2, B3, B4, P3 . . . . Upon coding, however, the order of coding is not the same as the above, since in the bi-directional prediction, the order of some picture data must be reversed in time. Changing of picture sequence is performed by the current picture memory 40 shown in FIG. 13. The coding is performed in the order of pictures I1, P2, B1, B2, P3, B3, B4 . . . , as shown in the parentheses in FIGS. 19A and 19B. That is, coding of two consecutive, bi-directionally predictive pictures (B pictures) are performed after a picture (I or P picture) later in time is coded. The picture data are stored alternately into reference picture memories 41 and 42. For I picture I1, predictive coding is not performed and the picture data is simply stored into reference picture memory 1 (41) in the cycle #1. P picture P2 is then stored in reference picture memory 2 (42) in the cycle #2. P picture P2 is coded referring to data of I picture I1 stored in reference picture memory 41. Thereafter, B pictures B1 and B2 are coded sequentially. When B picture B1 is coded in the cycle #3, the picture having pixel data stored in reference picture memory 1 (41) is a reference picture that is closer in time, and picture P2 that is stored in reference picture memory 2 (42) is more distant in time. Conversely, upon coding of B picture B2 in the cycle #4, P picture P2 that is stored in reference picture memory 2 (42) is a picture that is closer in time. As described above, in the reference picture memory to which data was written more recently, the data of a picture succeeding the two consecutive B pictures in time are stored. Therefore, after generation of two reference pictures, the first B picture is coded under the condition that the reference picture memory less recently subject to writing stores the pixel data that is closer in time, and then, the succeeding B picture is processed with the distance relation being reversed.

In the cycle #5, P picture P3 is coded referring to data of P picture P2 stored in reference picture memory 2 (42). In the coding of a P picture, a reference picture stored in a reference picture memory that is different from the reference picture memory storing pixel data of the target P picture is used as a reference picture for coding. Thus, it is possible to readily identify the reference picture memories based on these characteristics.

Address generating circuit 55c generates addresses sequentially using a counter, for example, with three consecutive addresses AD+(−96, −32 ), AD+(−32, −32), and AD+(32, −32) being leading addresses, according to a result of a determination by a B/P determining circuit, to read out search window pixel data (in this case, one reference picture memory is accessed). In the case of a B picture, address generating circuit 55c generates addresses AD+(−64, −32) and AD+(0, −32) for the reference picture memory storing pixel data of the picture that is distant in time, and generates address AD+(−32, −32) for the reference picture memory storing the pixel data of the closer-in-time picture. Here, address AD represents the center point of the template block, or a real rear point (0, 0). Thus, both reference picture memories 41 and 42 are accessed.

Buffer memory read control circuit 55f selectively activates buffer memory groups according to the output signal of memory distance decision circuit 55d that is activated when a B picture is coded, and generates addresses so as to sequentially read out vertically consecutive pixel data.

As explained above, according to the second embodiment of the present invention, the search areas for motion detecting units are changed depending on whether the target picture is a bi-directionally predictive picture or a unidirectionally predictive picture. In addition, the motion detecting units are used adaptively according to the characteristics of the target picture. Thus, motion vector detection can be performed efficiently.

Third Embodiment

FIG. 20 is a diagram illustrating search area allocation for a motion vector detecting apparatus according to the third embodiment of the present invention. In the third embodiment, the motion vector detecting apparatus includes three motion detecting units MD#1, MD#2 and MD#3, as in the case of the motion vector detecting apparatus shown in FIG. 8 according to the second embodiment. However, the sizes of search areas allocated to those motion detecting units MD#1–MD#3 in this embodiment are different from those in the second embodiment. In this embodiment, the search areas specific to motion detecting units MD#1 and MD#3 each have a range horizontally from −16 to +15 and vertically from −16 to +15. Search area SA2 specific to motion detecting unit MD#2 has a range horizontally from −64 to +63 and vertically from −31 to +31. Otherwise, the third embodiment has the same configuration as the second embodiment.

Also in the third embodiment, motion detecting units MD#1 and MD#3 each have a template block of 16 pixel rows and 4 pixel columns, and element processors are placed corresponding to these pixels. The template block size of motion detecting unit MD#2 is 16 pixel rows by 16 pixel columns, and element processors are disposed corresponding to the pixels. Thus, the amount of hardware is reduced in each of motion detecting units MD#1 and MD#3 to approximately one fourth compared to the case in which three motion detecting units each corresponding to 16 pixel rows by 16 pixel columns are used in parallel.

FIG. 21 is a diagram illustrating search area allocation for motion detecting units in the case where the target picture is a unidirectionally predictive picture. In FIG. 21, search area SA1 of motion detecting unit MD#1 has a range horizontally from −96 to −65 and vertically from −16 to +15 allocated thereto. Search area SA2 for motion detecting unit MD#2 has a range horizontally from −64 to +63 and vertically from −32 to +31 allocated thereto. Search area SA3 of motion detecting unit MD#3 has a range horizontally from +64 to +95 and vertically from −16 to +15 allocated thereto. These search areas allocated to motion detecting units MD#1MD#3 are not overlapped with one another.

When the search areas shown in FIG. 21 are used, it is possible to search a motion vector over a wide area with the center point (0, 0) being its center. A maximum size of motion vector search range can be allocated for a unidirectionally predictive picture having a large degree of motion, and thus, efficient motion vector detection is realized. Here, any of coarse search and full search may be performed.

FIG. 22 is a diagram illustrating search area allocation in the case where the target picture is a bi-directionally predictive picture. In FIG. 22, search area SA1 of motion detecting unit MD#1 has a range horizontally from −32 to −1 and vertically from −16 to +15 allocated thereto. Search area SA3 of motion detecting unit MD#3A has a range horizontally from 0 to 31 and vertically from −16 to +15 allocated thereto. These search areas SA1 and SA3 are used for a reference picture that has a small inter-frame distance and thus has a small degree of motion. On the other hand, a wide range horizontally from −64 to +63 and vertically from −32 to +31 is allocated for search area SA2, and is used for a reference picture having a greater inter-frame distance. As described above, a motion vector is detected in a relatively narrow area for a reference picture having a small inter-frame distance and a small degree of motion, and a larger search area is set for a reference picture having a large inter-frame distance and a large degree of motion. Thus, motion vector search can be performed efficiently.

In addition, the amount of hardware can be reduced to approximately ½ times compared to the case where three motion detecting units each with a search area horizontally from −32 to +31 and vertically from −32 to +31 are used, and accordingly, power consumption can be reduced. For such reconfiguration of search areas as well as adaptive use of motion detecting units, the same configuration as in FIG. 18 can be utilized. In that case, addresses to be generated by the address generating circuits are different due to the difference in search area sizes.

Figure 23:
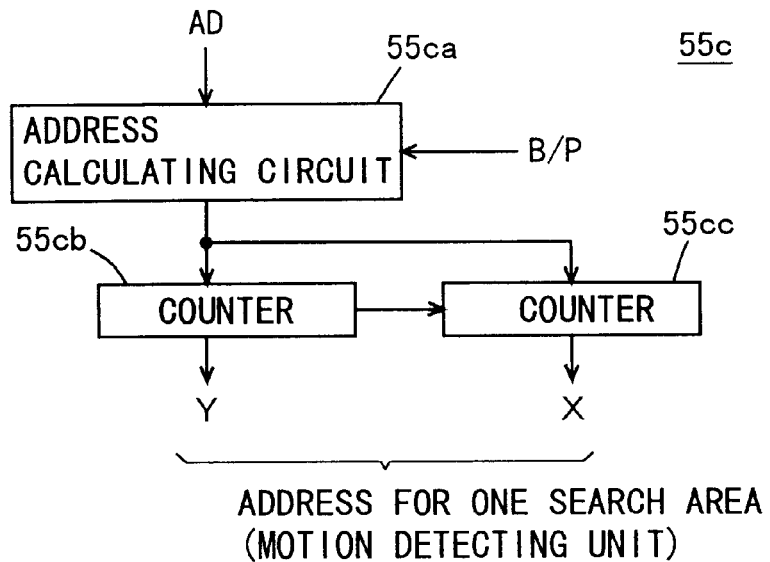
FIG. 23 is a diagram schematically showing a configuration of a reference picture memory address generating unit in a memory access control unit according to the third embodiment.

FIG. 23 schematically shows a configuration of a portion of address generating circuit 55c in the control circuit related to generation of an address for one search area (motion detecting unit). In FIG. 23, address generating circuit 55c includes: an address calculating circuit 55ca that receives template block address AD and calculates an address according to a picture characteristic designating signal B/P; a counter 55cb that has an address initialized to the address calculated by address calculating circuit 55ca and counts every clock cycle; and a counter 55cc that performs counting operation according to a count-up signal from counter 55cb. This counter 55cc has also an address initialized to the address from address calculating circuit 55ca. Counter 55cb outputs a Y address, and counter 55cc outputs an X address. Y address corresponds to a pixel position in a vertical direction, and X address corresponds to the pixel position in a horizontal direction.

Picture characteristic designating signal B/P indicates whether the target picture is a B picture or a P picture. Address calculating circuit 55ca generates a leading address, and pixel data in the search window are read out sequentially in the vertical direction. When the bottom of the search window is reached, pixel data on the next column of the search window are read out.

In the third embodiment, coarse search or fine search (full search) may be performed in motion detecting units MD#1 and MD#3. Horizontal and vertical components are those for the macroblock. When the coarse search is performed, the configuration shown in FIG. 18 can be utilized. For performing the full search, sub-sampling circuits 50 and 51 are removed. In the full search, motion detecting units MD#1 and MD#3 each have estimation points of 32×32=964, whereas motion detecting unit MD#2 has estimation points of 128×64=8192. The number of estimation points of motion detecting unit MD#2 is eight times those of motion detecting units MD#1 and MD#3, and thus, the cycle for calculating the estimation value is lengthened compared to those for motion detecting units MD#1 and MD#3. In this case, the operating frequency of motion detecting units MD#1 and MD#3 can be reduced to ⅛ that of motion detecting unit MD#2. (If the coarse search is performed, the operating frequency can further be reduced.)

As explained above, according to the third embodiment of the present invention, motion detecting units having different search areas are used adaptively according to the characteristics of the target picture. Thus, efficient motion vector detection can be realized without increasing the amount of hardware.

Fourth Embodiment

Figure 24:
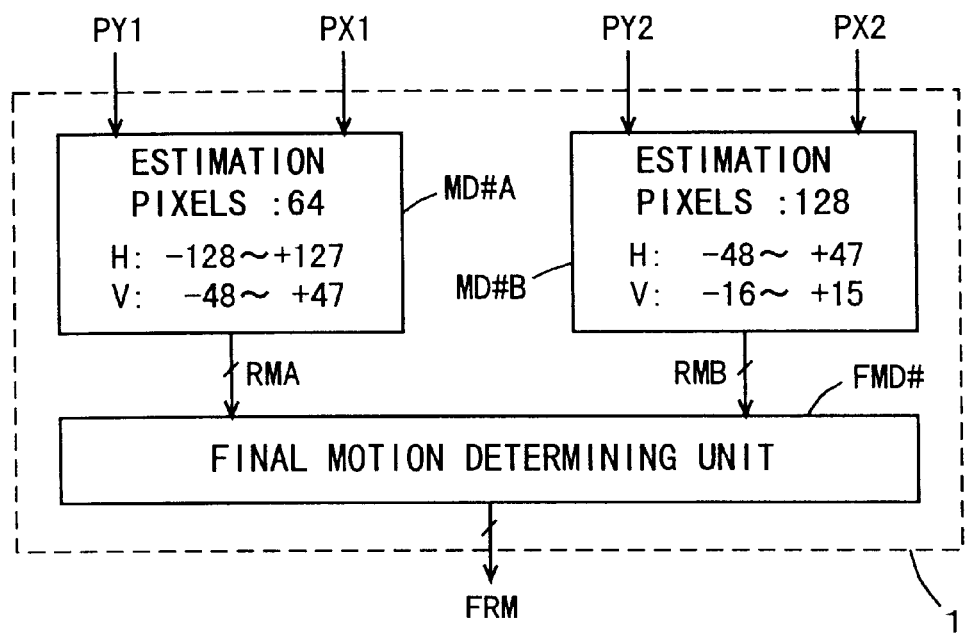
FIG. 24 is a diagram schematically showing a configuration of a motion vector detecting apparatus according to a fourth embodiment of the present invention.

FIG. 24 schematically shows an entire configuration of a motion vector detecting apparatus according to the fourth embodiment of the present invention. In FIG. 24, the motion vector detecting unit 1 includes: two motion detecting units MD#A and MD#B; and a final motion determining unit FMD# that generates final motion vector information FRM according to detection results RMA and RMB from motion detecting units MD#A and MD#B. Motion detecting unit MD#A has 64 estimation pixels, and has a specific search area of a range horizontally from −128 to +127 and vertically from −48 to +47.

Motion detecting unit MD#B has 128 estimation pixels and has a specific search area of a range horizontally from −48 to +47 and vertically from −16 to +15.

Figure 25:
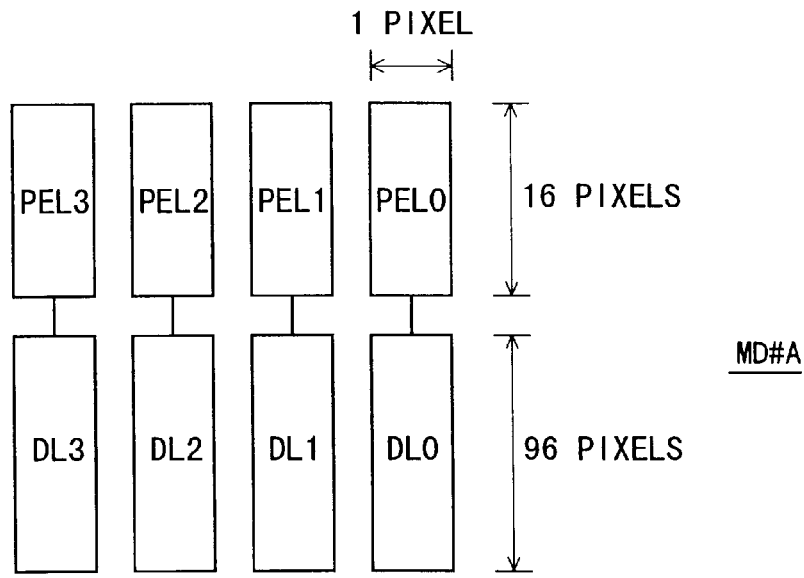
FIG. 25 is a diagram schematically showing a configuration of a motion detecting unit MD#A shown in FIG. 24.

FIG. 25 schematically shows a configuration of motion detecting unit MD#A shown in FIG. 24. With 64 estimation pixels, motion vector detection is performed for a template block of 4 pixel columns by 16 pixel rows. Thus, in the calculating unit, columns of element processors PEL0–PEL3 are disposed corresponding to the four pixel columns. Delay buffers DL0–DL3 are disposed corresponding to columns of element processors PEL0–PEL3, respectively. In each of element processor columns PEL0–PEL3, element processors corresponding to 16 pixels are connected in series. In each of delay buffers DL0–DL3, pixel data of vertically aligned 96 pixels are stored, and search of motion vector components vertically from −48 to +47 can simply be realized by shifting-in and shifting-out operations of pixel data.

Figure 26:
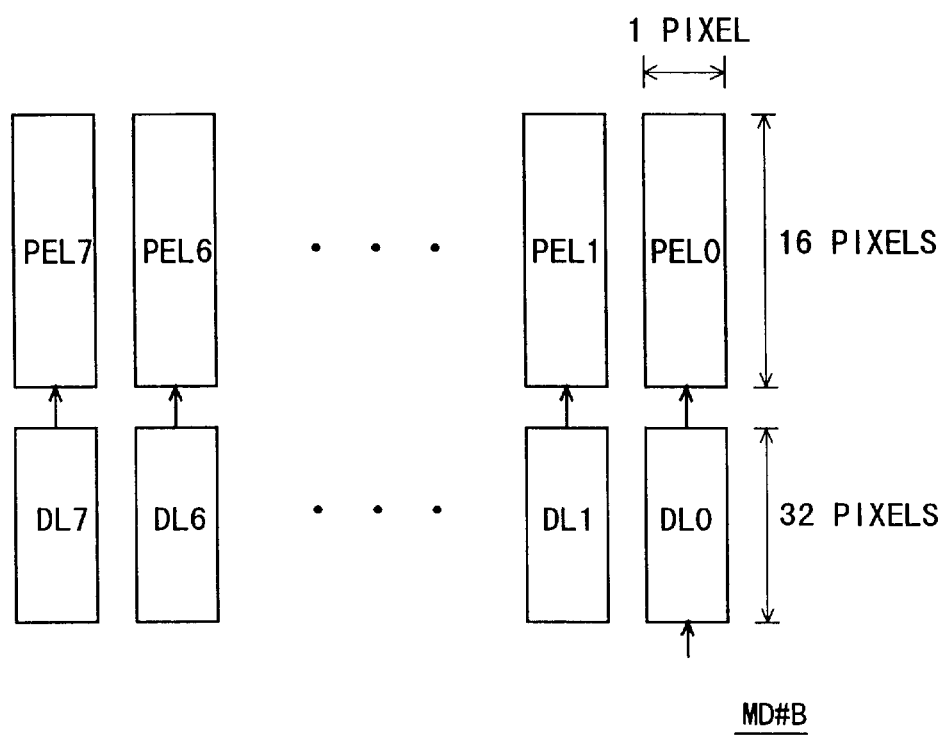
FIG. 26 is a diagram schematically showing a configuration of a motion detecting unit MD#B shown in FIG. 24.

Motion detecting unit MD#B has 128 estimation points, and performs motion vector search using a template block consisting of pixels arranged in 8 pixel columns by 16 pixel rows. Motion detecting unit MD#B includes, as seen from FIG. 26 showing its schematic configuration, eight columns of element processors PEL0–PEL7, and eight delay buffers DL0–DL7 disposed corresponding to the columns of element processors PEL0–PEL7. Each of columns of element processors PELO–PEL7 stores pixel data of 16 pixels, and each of delay buffers DLO–DL7 stores search window pixel data of 32 pixels. Thus, it is possible to search through a range vertically from −16 to +15, simply by shifting in and shifting out the search window pixel data.

As shown in FIGS. 25 and 26, the amounts of hardware of motion detecting units MD#A and MD#B are made substantially equal to each other in configuration of this calculating unit. However, the amount of hardware of motion detecting unit MD#A becomes approximately four times that of motion detecting unit MD#B, with the memory storing all the pixel data within the horizontal search range and the adder performing summation to calculate the estimation value taken into consideration.

Figure 27:
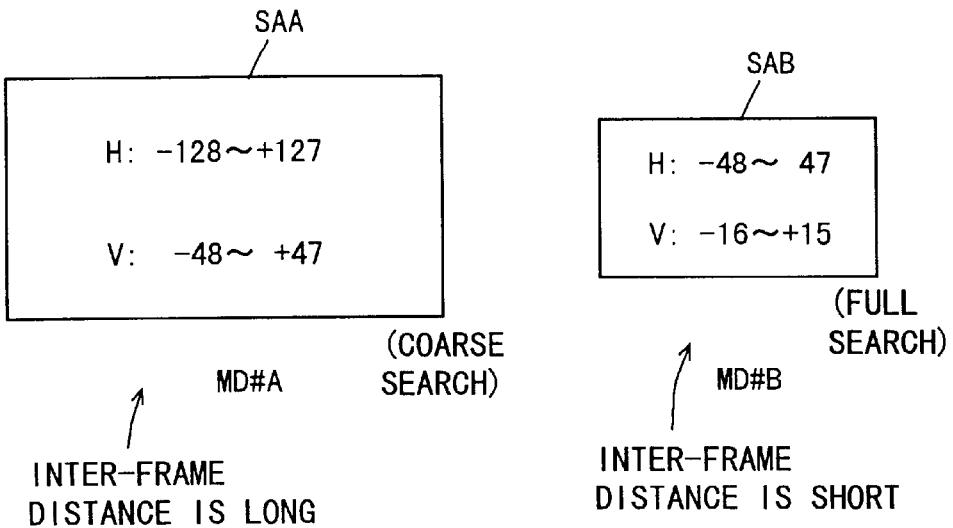
FIG. 27 schematically illustrates search area allocation for coding of a bi-directionally predictive picture according to the fourth embodiment.

FIG. 27 is a diagram illustrating search area allocation for the motion detecting units according to the fourth embodiment of the present invention. In the case where a target picture is a bi-directionally predictive picture (B picture), a range horizontally from −128 to +127 and vertically from −48 to +47 is allocated to a search area SAA of motion detecting unit MD#A. To a search area SAB of motion detecting unit MD#B, a range horizontally from −48 to +47 and vertically from −16 to +15 is allocated. For motion detecting unit MD#A, a reference picture having a longer inter-frame distance or being more distant in time from the target picture is allocated, whereas for motion detecting unit MD#B, a reference picture shorter in inter-frame distance or closer in time is allocated. In motion detecting unit MD#A, coarse search is performed over a wide search area, while in motion detecting unit MD#B, full search is performed in which estimation values are calculated for all the estimation points.

Figure 28:
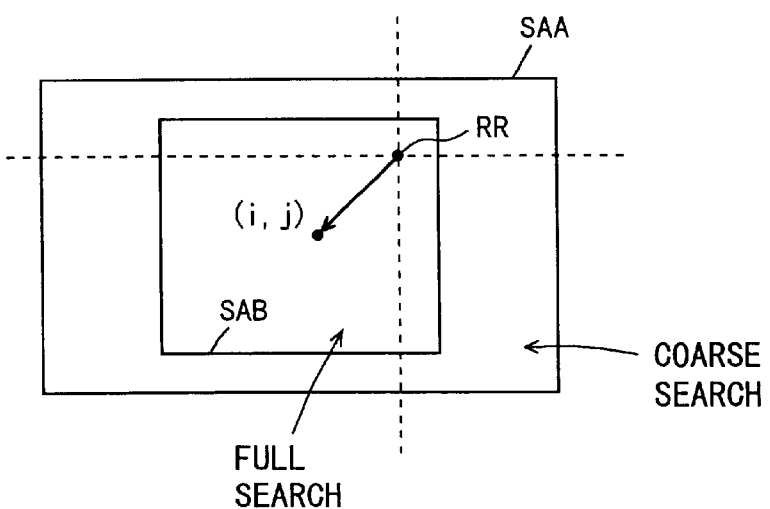
FIG. 28 schematically illustrates search area allocation for coding of a unidirectionally predictive picture according to the fourth embodiment.

FIG. 28 is a diagram illustrating search area allocation in the case where the target picture is a unidirectionally predictive picture (P picture). For this unidirectionally predictive picture, two motion detecting units MD#A and MD#B are also used. However, the search areas are set with a common center point offset by a positional vector (i, j) from the real rear point RR of the target template block. Thus, search area SAA of motion detecting unit MD#A has a range horizontally from −128-i to +127-i, and vertically from −48-j to +47-j. Search area SAB of motion detecting unit MD#B has a range horizontally from −48-i to +47-i, and vertically from −16-j to +15-j. Also in this case of unidirectionally predictive picture, coarse search is performed in search area SAA, and full search is performed in search area SAB.

The value of the center point (i, j) of the search areas for this unidirectionally predictive picture is determined according to the history of the motion vectors. Final motion determining unit FMD# determines a final motion vector as follows.

If the motion vector is detected in a region where search areas SAA and SAB are overlapping with each other, i.e., if it is detected within search area SAB, the result of detection through full search by motion detecting unit MD#B is selected preferentially.

If the motion vector is detected by motion detecting unit MD#A in a region where the two search areas do not overlap, the detection result is compared to that of motion detecting unit MD#B, and according to the result of comparison, the motion vector designating a block with greater correlation is selected. Here, the following equation is used as the criterion.

$$f\{MAD(1), MAD(2)\} = a \cdot MAD(1) - MAD(2) + b$$

where

MAD(1) is an estimation value of motion detecting unit MD#A,

MAD(2) is an estimation value of motion detecting unit MD#B, and a, b are arbitrary constants.

As motion detecting units MD#A and MD#B have different numbers of estimation pixels, constant "a" is applied for correction to normalize the estimation value (so that the number of estimation pixels are made effectively equal), and constant "b" is applied for offset. When the function f is positive, it means that the estimation value of the motion vector obtained by motion detecting unit MD#A is larger, and the motion vector detected by motion detecting unit MD#B is selected. If the function f is negative, the estimation value of motion vector from motion detecting unit MD#A is smaller and indicates greater correlation, and the motion vector detected by motion detecting unit MD#A is selected.

Thus, using two motion detecting units, efficiency or precision in motion vector search can be considerably improved as compared with the case where a single motion detecting unit is utilized. More specifically, compared to the case in which a motion detecting unit with the same amount of hardware and a similar number of estimation pixels as motion detecting unit MD#B is solely used, the search range can be significantly widened through coarse search, resulting in efficient motion vector search and improved motion vector searching efficiency. In addition, as compared with the case where a motion detecting unit (or motion predictor) having the same amount of hardware and using the similar number of estimation pixels as the motion detecting unit MD#A is solely used, full search method is utilized with the search area size substantially maintained. Therefore, more precise motion vector search becomes possible, and precision in motion vector search is significantly improved.

Figure 29:
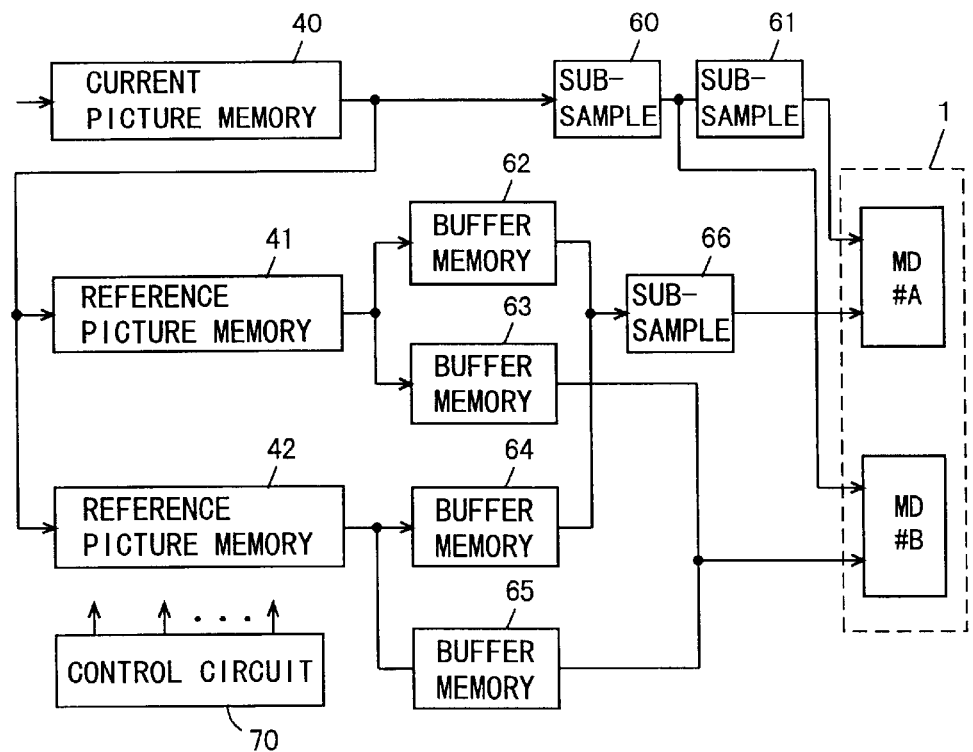
FIG. 29 is a diagram schematically showing a configuration of a system utilizing the motion vector detecting apparatus according to the fourth embodiment of the present invention.

FIG. 29 schematically shows a configuration of a motion vector detecting system including the motion vector detecting apparatus according to the fourth embodiment of the present invention. In FIG. 29, the same portions corresponding to those in the motion vector detecting system shown in FIG. 13 are denoted by the same reference numerals. In the motion vector detecting system shown in FIG. 29, two motion detecting units MD#A and MD#B are provided in motion vector detecting apparatus 1, and correspondingly two buffer memories 62 and 63 are provided for reference picture memory 41, and two buffer memories 64 and 65 are provided for reference picture memory 42. Data read out from buffer memories 62 and 64 are sent via sub-sampling circuit 66 to motion detecting unit MD#A. Data read out from buffer memories 63 and 65 are sent to motion detecting unit MD#B.

Motion detecting unit MD#A has 64 estimation pixels and motion detecting unit MD#B has 128 estimation pixels. Thus, in order to sub-sample a template block of 16 pixels by 16 pixels in a horizontal direction, sub-sampling circuits 60 and 61 are provided for sub-sampling data of horizontally aligned pixels in the pixel data from current picture memory 40. Here, sub-sampling circuits 60 and 61 are cascaded. Sub-sampling circuit 60 performs horizontally 2 to 1 sub-sampling, and applies the sub-sampled template block pixel data to motion detecting unit MD#B.

Receiving the sub-sampled pixel data from sub-sampling circuit 60, sub-sampling circuit 61 further performs horizontally 2 to 1 sub-sampling, and applies the resultant sub-sampled template block pixel data to motion detecting unit MD#A.

Allocation of search areas as well as distribution of search window pixel data are performed under the control of control circuit 70. When the target picture is a unidirectionally predictive picture, the search window pixel data stored in either reference picture memory 41 or 42 are utilized. For example, if the picture data stored in reference picture memory 41 are being utilized, buffer memories 62 and 63 are used. The search window pixel data from buffer memory 62 is horizontally sub-sampled by sub-sampling circuit 66, and coarse search is performed at motion detecting unit MD#A. The search window pixel data read out from buffer memory 63 are sent to motion detecting unit MD#B, where full search is performed.

If the target picture is a bi-directionally predictive picture, both reference picture memories 41 and 42 are used. If a reference picture that is closer in time to the target picture is stored in reference picture memory 41, buffer memories 63 and 64 are used. Specifically, the data of the reference picture that is closer in time are sent via buffer memory 63 to motion detecting unit MD#B and full search is performed therein. The data of the reference picture that is more distant in time are sent via buffer memory 64 and sub-sampling circuit 66 to motion detecting unit MD#A, where coarse search is performed.

Figure 30:
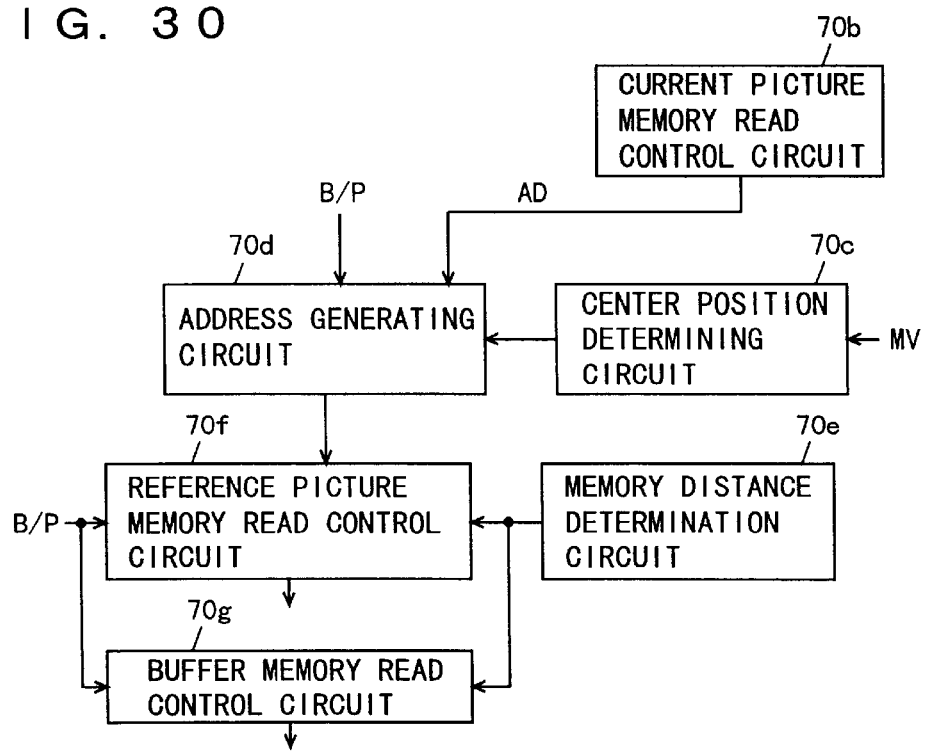
FIG. 30 is a diagram schematically showing a configuration of a control circuit shown in FIG. 29.

FIG. 30 schematically shows a configuration of control circuit 70 shown in FIG. 29. Control circuit 70 in FIG. 30 includes: a current picture memory read control circuit 70b that is activated in response to a picture header, to perform reading of picture data from a current picture memory; a center position determining circuit 70c that receives finally determined motion vectors MV over a prescribed number of operation cycles (cycles for detecting a motion vector) or over a plurality of pictures, and determines the center position of the search area according to the history of the motion vectors MV; an address generating circuit 70d that receives picture characteristic designating signal B/P, template block address AD from current picture memory read control circuit 70b and the center position from center position determining circuit 70c, for determining a search area to generate an address for the determined search area; a memory distance determination circuit 70e that determines, according to a temporal reference value, which of reference picture memories 41 and 42 stores a reference picture that is closer in time to the target picture; a reference picture memory read control circuit 70f that applies an address signal and a memory activation signal to reference picture memories 41 and 42 according to an address from address generating circuit 70d and an output signal of memory distance decision circuit 70e; and a buffer memory read control circuit 70g that selectively activates buffer memories according to a decision result designating signal from memory distance decision circuit 70e.

Center position determining circuit 70c calculates, for example, an average value of motion vectors over a prescribed number of operation cycles or over a plurality of pictures, and adds this averaged motion vector to the most recent motion vector to determine the center position. In this calculation, the average value may be obtained by applying appropriate weights to the motion vectors of the prescribed number of operation cycles or of the plurality of pictures, according to their distances from the target template block or the current picture.

Address generating circuit 70d calculates the center position (a, b) of the search area based on address AD received from current picture memory read control circuit 70b, and utilizes the center position (i, j) obtained from center position determining circuit 70c to calculate a corrected center position (a-i, b-j) of the search area. Using this center position as a real rear point, address generating circuit 70d generates addresses for search areas SAA and SAB. When picture characteristic designating signal B/P indicates that the target picture is a bi-directionally predictive picture, address generating circuit 70d ignores the center position information output from center position determining circuit 70c, to generate the addresses for search areas SAA and SAB simply according to template block address AD from current picture memory read control circuit 70b.

Memory distance decision circuit 70e determines which of reference picture memories 41 and 42 stores a reference picture having a shorter inter-frame distance, according to the sequence shown in FIG. 19, as in the third embodiment above. Reference picture memory read control circuit 70f determines which of reference picture memories 41 and 42 should be activated according to picture characteristic designating signal B/P, and allocates the address received from address generating circuit 70d to the reference picture memory to be accessed. Buffer memory read control circuit 70g selectively activates buffer memories 62–65, according to picture characteristic designating signal B/P.

With control circuit schematically shown in FIG. 30, both reference picture memories 41 and 42 are utilized when the target picture is a bi-directionally predictive picture, and only one of reference picture memories 41 and 42 is used when the target picture is a unidirectionally predictive picture, and buffer memories 62–65 are selectively activated. Accordingly, motion detecting units MD#A and MD#B can perform motion vector detection according to the characteristics of the target picture.

Figure 31:
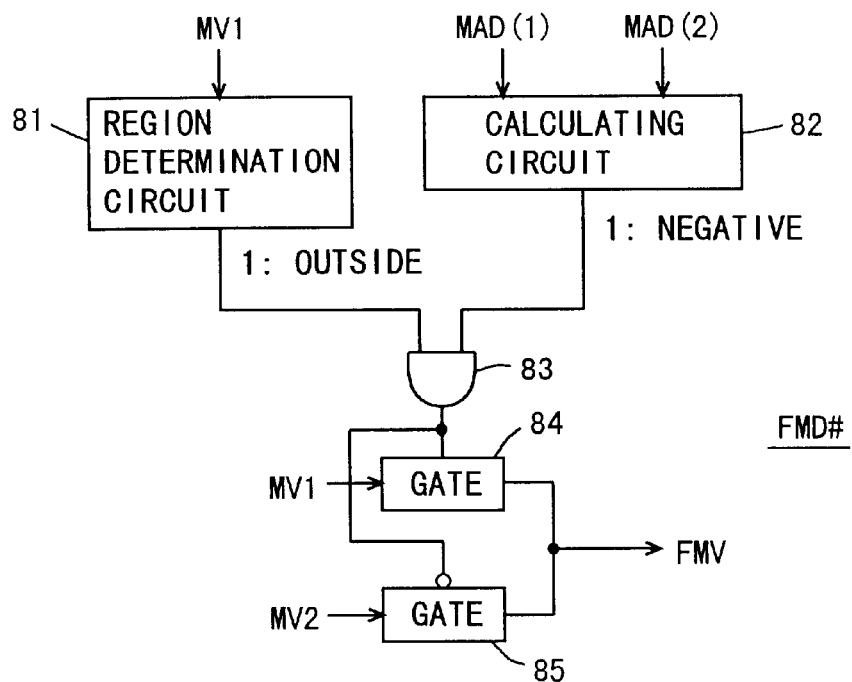
FIG. 31 is a diagram schematically showing a configuration of a final motion determining unit according to the fourth embodiment.

FIG. 31 schematically shows a configuration of final motion determining unit FMD# shown in FIG. 24. In FIG. 31, final motion determining unit FMD# includes: a region determination circuit 81 that determines whether motion vector MV1 from motion detecting unit MD#A exists within search area SAB or not; a calculating circuit 82 that performs the previously described calculation with estimation values MAD(1) and MAD(2) from motion detecting units MD#A and MD#B, and outputs a signal indicating the sign of the calculation result; an AND circuit 83 that outputs a signal at an H level when it receives an out-of-region indicating signal from region determination circuit 81 and a negative-sign indicating signal from calculating circuit 82; a gate circuit 84 that is rendered conductive when the output signal from AND circuit 83 is at the H level to cause motion vector MV1 to pass therethrough; and a gate circuit 85 that is rendered conductive when the output signal of AND circuit 83 is at an L level to cause motion vector MV2 to pass therethrough. Gate circuits 84 and 85 each are set at an output high impedance state when unselected.

Region determination circuit 81 outputs a signal "1" (at an H level) when motion vector MV1 is outside search area SAB. Calculating circuit 82 outputs a signal "1" (at an H level) when the result of calculation is negative. Region determination circuit 81 compares a horizontal component H and a vertical component V of motion vector MV1 with horizontal and vertical components of search area SAB, and determines whether motion vector MV1 is within search area SAB or not according to the result of comparison. Calculating circuit 82 simply performs operations according to the decision function f, and outputs a signal indicating the sign of the result of calculation. If the result of calculation is represented by 2's complement notation, the sign of the result can be determined from the most significant bit.

AND circuit 83 outputs a signal at an H level when the signals from region determination circuit 81 and calculating circuit 82 are both "1" at the H level. Therefore, gate circuit 84 is rendered conductive only when motion vector MV1 detected by motion detecting unit MD#A is outside search area SAB and the result of calculation by calculating circuit 82 is negative. Otherwise, gate circuit 85 is rendered conductive, and motion vector MV2 detected by motion detecting unit MD#B is output as final motion vector FMV.

The configuration shown in FIG. 31 is provided for each category of motion vectors to be finally generated. In the case of frame prediction, there exist a motion vector for a frame, another for a top field, and the other for a bottom field. Thus, the configuration shown in FIG. 31 is provided for each of these three motion vectors.

As described above, according to the fourth embodiment of the present invention, motion detecting units are used adaptively according to the predicting method applied to the current picture as well as the inter-frame distance, and their search areas are allocated accordingly. Therefore, it is possible to perform motion vector detection efficiently.

In addition, the center point of the search area is offset from the position of the real rear point, so that the entire screen image moves in the same direction. Accordingly, a motion vector can be detected efficiently in the case where an image on a part of the screen slightly moves.

Fifth Embodiment

Figure 32:
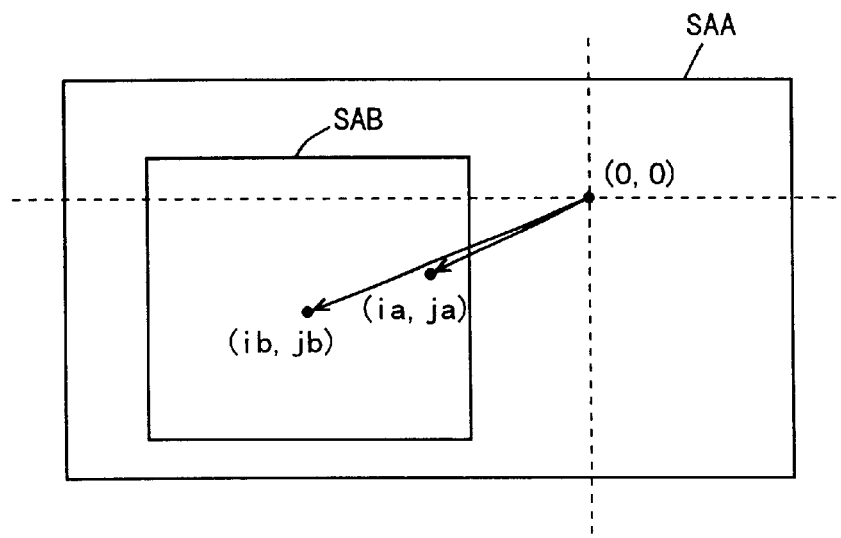
FIG. 32 schematically illustrates search area allocation for a motion vector detecting apparatus according to a fifth embodiment of the present invention, upon coding of a unidirectionally predictive picture.

FIG. 32 is a diagram illustrating search area allocation according to the fifth embodiment of the present invention. Though a configuration as in FIG. 24 is used, in the configuration shown in FIG. 32, the center position of the search area SAA allocated to motion detecting unit MD#A is set at a position (ia, ja) that is offset from the real rear point (0, 0), and the center point of search area SAB allocated to motion detecting unit MD#B is set at a position (ib, jb) that is also different from the real rear point (0, 0). In addition, the center points (ia, ja) and (ib, jb) of respective search areas SAA and SAB are set at positions different from each other. Otherwise, the configuration shown in FIG. 32 is identical to that in FIG. 24. By setting the center positions of search areas SAA and SAB at different positions, it becomes possible to detect a motion vector effectively in the case where two moving objects move in different directions. Motion detecting unit MD#B performing full search in search area SAB is adapted to follow the delicate movement of an object and motion detecting unit MD#A performing coarse search is adapted to follow the overall movement. Thus, efficient motion detection becomes possible.

Figure 33:
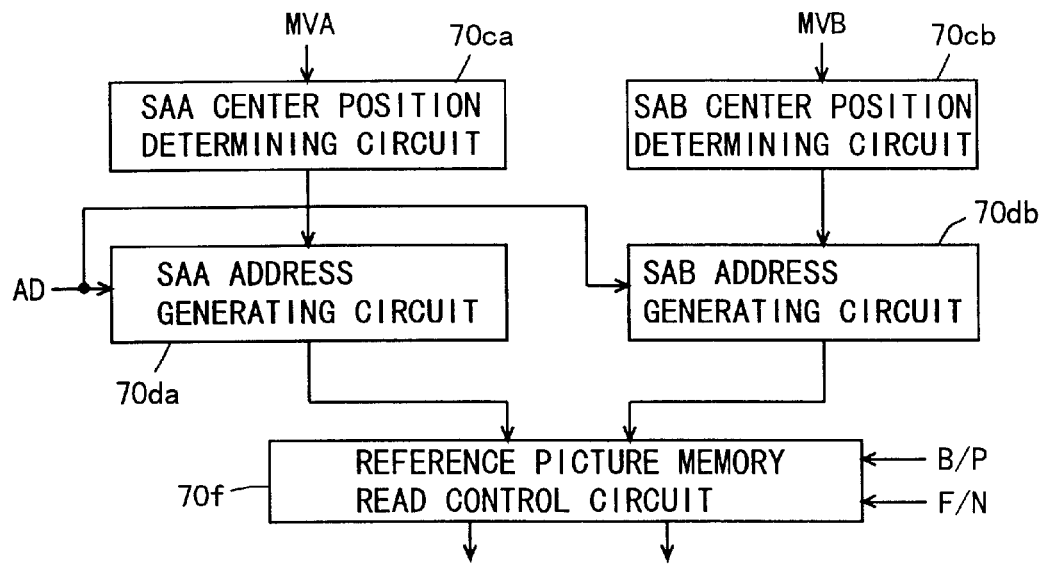
FIG. 33 is a diagram schematically showing a configuration of a control circuit according to the fifth embodiment.

FIG. 33 schematically shows a configuration of a search area address generating unit included in the control circuit (see FIG. 29) according to the fifth embodiment of the present invention. The address generating unit in FIG. 33 includes: an SAA center position determining circuit 70ca that receives motion vectors MVA from motion detecting unit MD#A over a plurality of pictures or a plurality of template blocks to determine a center position for search area SAA; an SAB center position determining circuit 70cb that receives motion vectors MVB from motion detecting unit MD#B over a plurality of pictures or a plurality of template blocks to determine a center position for search area SAB; an SAA address generating circuit 70da that generates an address designating search area pixel data for search area SAA, according to template block address ADD from current picture memory read control circuit 70b shown in FIG. 30 and the center position information from SAA center position determining circuit 70ca; an SAB address generating circuit 70db that generates an address for search area SAB according to template block address AD and the center position information from SAB center position determining circuit 70cb; and a reference picture memory read control circuit 70f that receives address signals from SAA address generating circuit 70da and SAB address generating circuit 70db to read out pixel data from corresponding reference picture memory according to picture characteristic designating signal B/P and a signal F/N indicating the length of inter-frame distance.

For example, SAA center position determining circuit 70ca and SAB center position determining circuit 70cb receive and store motion vectors over a plurality of pictures from motion detecting units MD#A and MD#B, respectively, and determine center positions for respective search areas SAA and SAB according to the histories of the motion vectors for the template blocks at the same position over the plurality of pictures. In this case, they may be configured to receive motion vector information MVA and MVB from motion detecting units MD#A and MD#B, respectively, within one picture, to further modify the center positions initially set.

As described above, two center position determining circuits are provided for determining center positions of respective search areas, and addresses for the search window pixel data are generated separately. Thus, it is possible to differentiate from each other the center positions of search areas for motion detecting units MD#A and MD#B. Accordingly, in the case where two moving objects move in different directions, respective search areas can be allocated for the different directions, resulting in efficient motion vector detection.

Upon the bi-directional prediction, search areas SAA and SAB are set in different reference pictures. In this case, the motion vector search areas for respective template blocks of these two reference pictures have center points that are set at the same point (including the real rear point) or set at different points.

Sixth Embodiment

Figure 34:
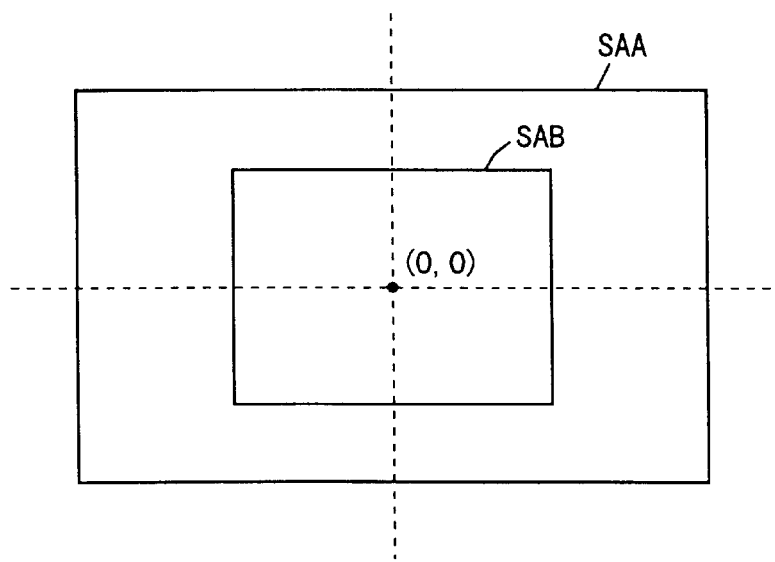
FIG. 34 schematically illustrates search area allocation for a motion vector detecting apparatus according to a sixth embodiment of the present invention, upon coding of a unidirectionally predictive picture.

FIG. 34 illustrates search area allocation according to the sixth embodiment of the present invention. In the configuration shown in FIG. 34, two motion detecting units MD#A and MD#B are used in the motion vector detecting apparatus, as in the fourth embodiment. In this embodiment, search areas SAA and SAB for these motion detecting units MD#A and MD#B are different in size from each other. When a unidirectionally predictive picture is employed, the center points of search areas SAA and SAB are set at the real rear point (0, 0). The motions are normally concentrated about the real rear point, and thus, the motion vector is very likely to be detected near the real rear point (0, 0). Accordingly, it is possible to make small the set value for overall motion predicting range F-code. Here, in the MPEG method, this prediction range F-code is stored following the picture head in a picture layer (i.e., a frame consisting of one picture), and is the data indicating the motion vector search range in both horizontal and vertical directions. The motion vector detecting apparatus has its motion vector search range set according to this information. By setting the center points of search areas SAA and SAB fixed to the real rear point (0, 0), a configuration for changing the center points of search areas becomes unnecessary, and thus, the amount of hardware is reduced.

For a bi-directionally predictive picture, the center points of the search areas may also be set at the same position, or alternatively, the center points for respective search areas may be offset from the real rear point (0, 0). The control circuit for the sixth embodiment is readily implemented from that in the fourth embodiment, by simply fixing the center position from the center position determining circuit to the real rear point (0, 0).

As described above, according to the sixth embodiment of the present invention, the center points of two search areas are both set at the real rear point for the unidirectionally predictive picture. Accordingly, it is possible to search a motion vector about the real rear point where motions are likely to concentrate, and thus, efficient motion vector detection is realized without increasing the amount of hardware.

Seventh Embodiment

FIG. 35 schematically shows search area allocation according to the seventh embodiment of the present invention. In the configuration shown in FIG. 35, when the target picture is a unidirectionally predictive picture, the center positions (ia, ja) and (ib, jb) of respective search areas SAA and SAB are set different from each other, as in the fifth embodiment above. In the seventh embodiment, however, one of the center points (ia, ja) and (ib, jb) is set at the real rear point (0, 0). For example, when the center point (ib, jb) is set at the real rear point (0, 0), it is possible to effectively detect a motion vector for a picture in which an image on the entire screen moves in one direction but an image on a part of the screen moves with the original point being the center.

In the seventh embodiment, when the target picture is a bi-directionally predictive picture, the center points of the search areas may be set desirably, since the search areas are set for different reference pictures.

To achieve the search area allocation as shown in FIG. 35, the address generating unit shown in FIG. 33 is simply modified such that either SAA center position determining circuit 70ca or SAB center position determining circuit 70cb in the address generating unit fixedly sets a center position to the real rear point (0, 0). Of course, in the configuration shown in FIG. 35, the center position set by either center position determining circuit 70ca or 70cb may possibly become equal to the real rear point (0, 0), dependent on the history of motion vectors. In this case, one of the center positions (ia, ja) and (ib, jb) of respective search areas SAA and SAB is set at the real rear point (0, 0) according to the motion. If the center point (ia, ja) is set at the real rear point (0, 0), it is possible to efficiently detect a motion vector when the motion in the entire screen is small and only an image on a portion of the screen moves. The configuration of the seventh embodiment is identical to that of the fifth embodiment.

By setting one of the center points of search areas at the real rear point, a configuration for changing the position of the search area becomes unnecessary, and thus, the amount of hardware is reduced.

Eighth Embodiment

FIG. 36 schematically shows a configuration of a motion vector detecting apparatus according to the eighth embodiment of the present invention. In FIG. 36, the motion vector detecting apparatus 1 includes two motion detecting units MD#C and MD#D, and a final motion determining unit FMD# that determines a final motion vector according to the results of detection by motion detecting units MD#C and MD#D.

Motion detecting unit MD#C detects a motion vector in an integer precision, and its specific search area has a range horizontally from −64 to +63 and vertically from −32 to +31. It has64 estimation pixels, and a template block of a size of 16 pixel rows by 4 pixel columns.

Motion detecting unit MD#D detects a motion vector in a fractional precision (half-pel precision), and its specific search area has a range horizontally from −4 to +3 and vertically from −2 to +1. It has 128 estimation pixels, and utilizes a template block having a size of 8 pixel columns and 16 pixel rows.

In the configuration shown in FIG. 36, motion detecting unit MD#C first detects a motion vector in the integer precision. Based on the motion vector obtained in the integer precision, motion detecting unit MD#D detects a motion vector in the fractional precision in the proximate region. Final motion determining unit FMD# outputs the motion vector obtained in the fractional precision by motion detecting unit MD#D as a final motion vector.

Figure 37:
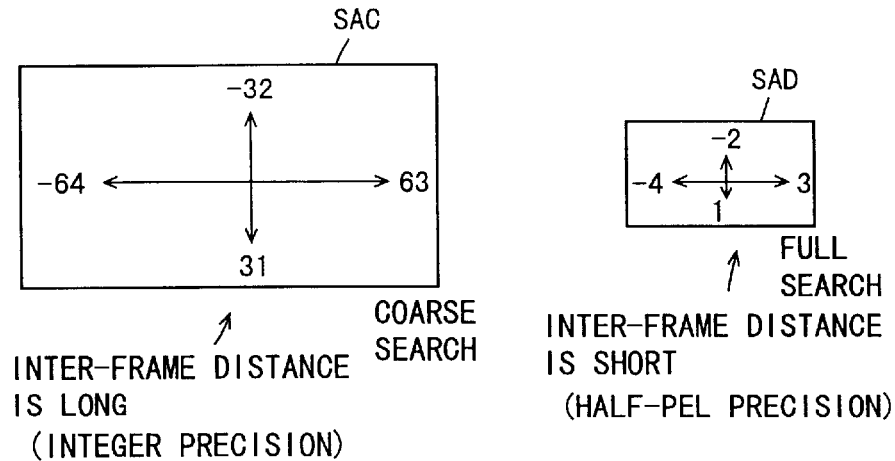
FIG. 37 schematically illustrates search area allocation for a motion vector detecting apparatus according to the eighth embodiment, upon coding of a bi-directionally predictive picture.

FIG. 37 is a diagram illustrating search area allocation in the case where the target picture is a bi-directionally predictive picture. In FIG. 37, a reference picture having a long inter-frame distance is allocated to motion detecting unit MD#C, and coarse search is performed within its search area SAC. On the other hand, a reference picture having a shorter inter-frame distance is allocated to motion detecting unit MD#D, and full search is performed in the half-pel precision within the sub-search area SAD. In this half-pel precision, the motion vector components change at a step of 0.5.

Since the reference picture with a long inter-frame distance is allocated to motion detecting unit MD#C of the integer precision, the motion vector can be detected over a wide area, so that efficient motion vector detection is realized for a picture having a large degree of motion. In this search, coarse search (sub-sampling of estimation points) is performed, which reduces the time required for the motion vector detection.

In contrast, for the reference picture having a shorter inter-frame distance, motion detecting unit MD#D of the half-pel precision exhaustively searches through a narrow area, and precisely detects the motion vector for the picture with a small degree of motion.

Figure 38:
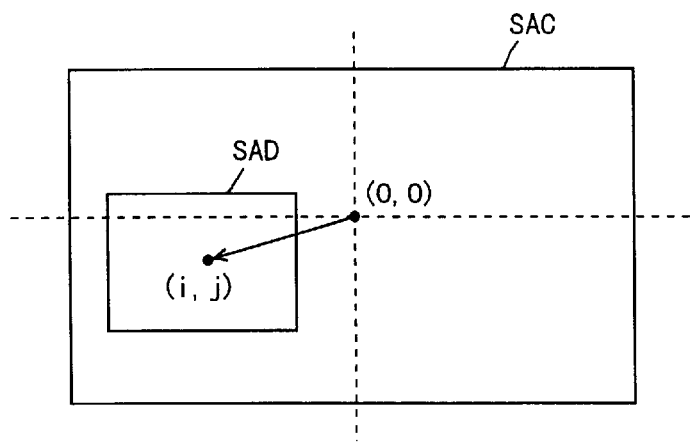
FIG. 38 schematically illustrates search area allocation according to the eighth embodiment, upon coding of a unidirectionally predictive picture.

FIG. 38 illustrates search area allocation in the case where the target picture is a unidirectionally predictive picture. In the case of the unidirectionally predictive picture, motion detecting unit MD#C has search area SAC over a wide range horizontally from −64 to +63 and vertically from −32 to +31. Though the search over this wide range may be either coarse or full, coarse search is preferable to reduce the time required for calculation. Once a motion vector is detected within this search area SAC, the motion vector information detected is sent to motion detecting unit MD#D. In motion detecting unit MD#D, motion vector detection is performed within its search area SAD (of a size horizontally from −4 to +3 and vertically from −2 to +1) with the motion vector (i, j) detected in motion detecting unit MD#C being the center. Thus, efficient and accurate motion vector detection is realized for a unidirectionally predictive picture having a large degree of motion.

Figure 39:
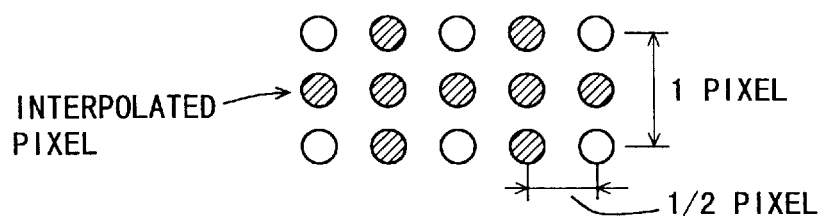
FIG. 39 schematically illustrates distribution of search area pixels upon motion vector detecting operation in a half-pel precision.

FIG. 39 is a diagram illustrating distribution of pixels used for search in the half-pel precision. On the display screen, as shown in FIG. 39, pixels represented by hollow circles are arranged in rows and columns. To perform half-pel precision search, interpolated pixels are produced using their adjacent pixels and inserted between the original adjacent pixels. If an interpolated pixel is needed in the middle of four pixels, an average value of these adjacent four pixels is obtained to produce the interpolated pixel. When an interpolated pixel is to be placed between two pixels (where a horizontal or vertical component is noninteger), the average value of the adjacent two pixels is used to produce the interpolated pixel.

Accordingly, in motion detecting unit MD#D of the half-pel precision, an interpolation circuit 90 is provided at a preceding stage of the calculating unit, to produce interpolated pixels for interpolation of the search area pixels. The interpolated pixels produced by this interpolation circuit and the original pixels are sent as the search area pixel data to the calculating unit.

Figure 40:
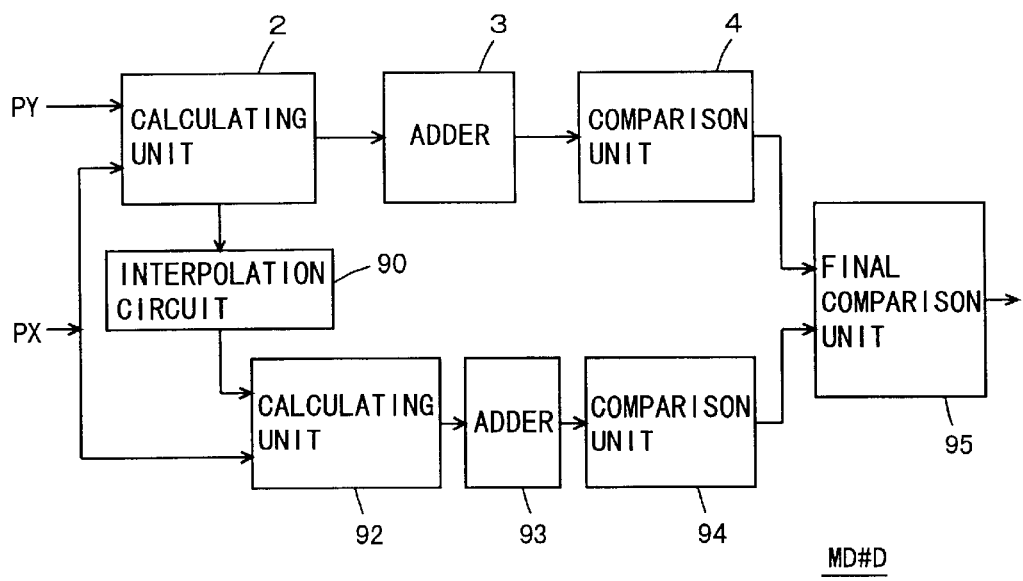
FIG. 40 is a diagram schematically showing a configuration of a motion detecting unit of a half-pel precision according to the eighth embodiment.

FIG. 40 schematically shows a configuration of motion detecting unit MD#D. In FIG. 40, motion detecting unit MD#D includes: a calculating unit 2 that receives template block pixel data PX and search window pixel data PY to perform an operational process; an adder 3 that adds the estimation values from calculating unit 2; a comparison unit 4 that compares the estimation value from adder 3 with that from the past cycle to detect a motion vector candidate; an interpolation circuit 90 that generates interpolating data from the search area pixel data shifted out from calculating unit 2; a calculating unit 92 that performs an operational process similar to that of calculating unit 2 according to the search area pixel data from interpolation circuit 90 and template pixel data PX; an adder 93 that adds the estimation value components output from calculating unit 92; a comparison unit 94 that detects a motion vector candidate according to the estimation value from calculating unit 93; and a final comparison unit 95 that detects a final motion vector according to the estimation values output from comparison units 4 and 94.

The search area pixel data are shifted out pixel by pixel from calculating unit 2, as explained in conjunction with FIGS. 3 to 6B. The shifted out pixel data are those scanned in the vertical direction in the search area. Interpolation circuit 90 is formed of a delay circuit for a vertical size of the search window, i.e., 20 pixels and a one-pixel delaying circuit, and produces interpolated pixels. Calculating unit 92 receives the interpolated pixel data as the search area pixel data. Thus, in motion detecting unit MD#D of the half-pel precision as shown in FIG. 40, motion vectors are first detected in the integer precision by calculating unit 2, and when interpolation circuit 90 as generates and stores a necessary number of interpolated pixel data, the estimation values can be calculated in parallel in the fractional precision (with at least either horizontal or vertical component being a non-integer or fraction).

After the vector is detected in the integer precision at calculating unit 2, final comparison unit 95 latches the motion vector candidate value output from comparison unit 4 and corresponding estimation value, and compares the estimation value with that received from comparison unit 94 to determine a final motion vector. Accordingly, in parallel with the calculating operation at calculating unit 92 in the fractional precision, calculating unit 2 can perform calculation of estimation values for the next template block.

When the target picture is a unidirectionally predictive picture, search area pixel data PY sent to calculating unit 2 are also sent to motion detecting unit MD#C in parallel. When the target picture is a bi-directionally predictive picture, the search area for the half-pel search is determined based on the result of motion detection by motion detecting unit MD#C, and corresponding data are read out from the reference picture memory.

The motion vector detecting system for the eighth embodiment has a configuration identical to that shown in FIG. 29, except that the storage capacities of buffer memories 62–65 shown in FIG. 29 are different (as the storage capacities are set according to the search areas).

Figure 41:
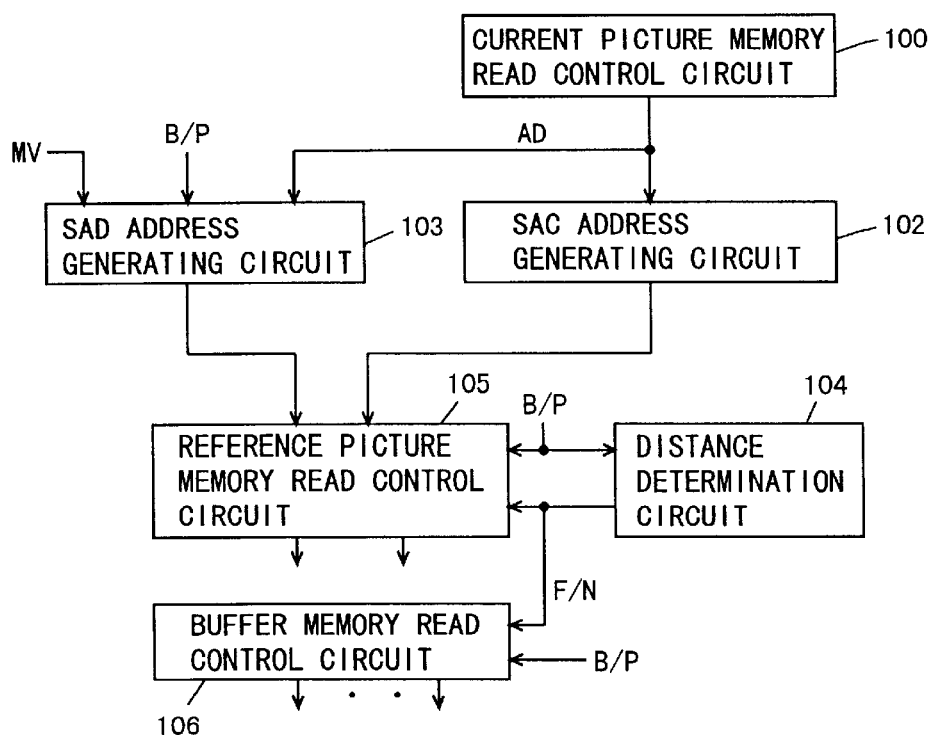
FIG. 41 is a diagram schematically showing a configuration of a control circuit for the motion vector detecting apparatus according to the eighth embodiment.
Figure 42:
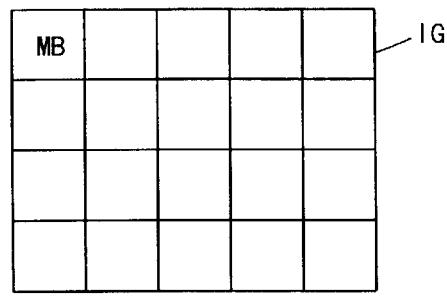
FIG. 42 is a diagram schematically showing a configuration of a macroblock used in a block matching method.
Figure 43:
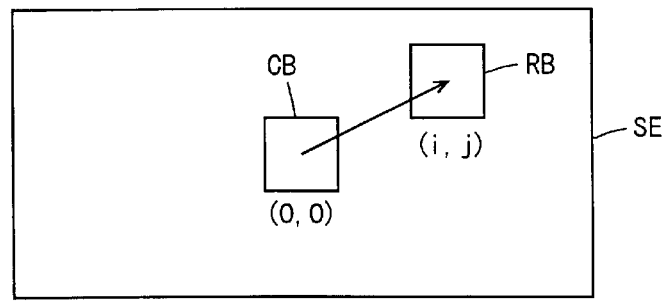
FIG. 43 is a diagram illustrating motion vector detecting operation according to the block matching method.

FIG. 41 is a diagram schematically showing a configuration of a memory control unit according to the eighth embodiment of the present invention. The memory read control unit in FIG. 41 includes: a current picture memory read control circuit 100 that controls reading of pixel data of the current picture memory; an SAC address generating circuit 102 that generates an address for search area SAC according to template block address AD from current picture memory read control circuit 100; an SAD address generating circuit 103 that generates an address for search area SAD according to one of template block address AD and motion vector Mv in response to picture characteristic designating signal B/P; a distance determination circuit 104 that determines which one of the reference picture memories stores a reference picture that is closer in time according to picture characteristic designating signal B/P; a reference picture memory read control circuit 105 that controls access to each reference picture memory based on the addresses received from address generating circuits 102 and 103, according to a determination result designating signal F/N from distance determination circuit 104 and picture characteristic designating signal B/P; and a buffer memory read control circuit 106 that controls reading of the buffer memories according to designating signals B/P and F/N.

When buffer memories each store pixel data of a size of a respective search area, buffer memory read control circuit 106 controls reading of the buffer memories such that vertically aligned pixel data are sequentially read out from the pixel data in the search area. When the buffer memories each have a capacity enough to store the pixel data of the search window and also have a first-in first-out configuration, buffer memory read control circuit 106 simply controls activation/inactivation of the buffer memories.

Reference picture memory read control circuit 105 reads out the pixel data written in a raster scan order in the sequence of vertically consecutive pixels in the search area, and stores them sequentially in the buffer memories. The configuration of the buffer memory is a mere example. The buffer memory may be formed of a random access memory, and may have a configuration in which address conversion is performed between the writing and reading of pixel data such that the pixel data are stored in a raster scan order and then sequentially read out in the vertical direction on a unit of column of the search window.

Referring to the configuration of the control unit shown in FIG. 41, when picture characteristic designating signal B/P indicates that the target picture is a bi-directionally predictive picture, SAD address generating circuit 103 ignores motion vector MV and generates an address for search area SAD of motion detecting unit MD#D according to template block address AD. To the reference picture memory determined to store picture data of a reference picture that is closer in time by distance determination circuit 104, reference picture memory read control circuit 105 provides the address received from SAC address generating circuit 102, while it provides the address received from SAD address generating circuit 103 to the reference picture memory determined to store pixel data of a reference picture that is more distant in time or having a longer inter-frame distance. Buffer memory read control circuit 106 similarly activates buffer memories that are provided corresponding to the reference picture memories storing data preceding and succeeding in time.

If picture characteristic designating signal B/P indicates that the target picture is a unidirectionally predictive picture, SAD address generating circuit 103 ignores template block address AD. SAC address generating circuit 102 generates the address for motion detecting unit MD#C according to template block address AD. Reference picture memory read control circuit 105 accesses the reference picture memory written less recently according to picture characteristic designating signal B/P, and sequentially reads out the pixel data for search area SAC and stores them in the corresponding buffer memory. Buffer memory read control circuit 106 activates the corresponding buffer memory according to picture characteristic designating signal B/P, and sequentially reads out the pixel data for search area SAC to motion detecting unit MD#C. When motion detecting unit MD#C completes its motion detecting operation, SAD address generating circuit 103 is activated to generate the address for search area SAD based on motion vector MV detected in an integer precision. Thereafter, reference picture memory read control circuit 105 again accesses the corresponding reference picture memory according to the address received from SAD address generating circuit 103, and reads out necessary pixel data to corresponding buffer memory. Buffer memory read control circuit 106 reads the pixel data from the corresponding buffer memory again, and sends the search area pixel data to motion detecting unit MD#D for motion detection in a half-pel precision.

In the eighth embodiment, the center of the search area is set at the real rear point (0, 0) upon processing of a unidirectionally predictive picture. This is because the motion vector is detected within search area SAD in the half-pel precision, and thus, it is unnecessary to offset the center point from the real rear point.

As described above, according to the eighth embodiment of the present invention, motion detecting units of an integer precision and of a half-pel precision are adaptively used dependent on the characteristic (or method of predictive coding) of a picture of interest. Therefore, efficient motion vector detection is realized.

Other Configurations

In the above configurations, a template block sub-sampled into 4 pixel columns and 16 pixel rows is used when the number of estimation pixels is 64, supposing the case of coding a frame picture. If the target picture is a field picture, however, a template block sub-sampled into 8 pixel rows and 8 pixel columns may be used for the same 64 estimation pixels.

Furthermore, for the configuration of motion detecting unit MD#D of a half-pel precision, a processor disclosed by Ishihara et al. in the above ISSCC may be employed. The precision for detection of motion detecting unit MD#D may be other fractional precision, such as ¼ precision.

As described above, according to the present invention, motion detecting units having different numbers of estimation pixels are provided and are adaptively used according to the characteristics of a target picture. This enables efficient motion vector detection, and also restricts an increase in the amount of hardware, and hence, an increase in power consumption.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for detecting a motion vector according to a block matching method, comprising:

a plurality of motion vector detecting units each receiving pixel data of a template block included in a current picture and pixel data of a search area included in a reference picture for performing a prescribed operational process according to said block matching method to detect a motion vector of said template block based on a result of the process, said plurality of motion vector detecting units including motion vector detecting units differing in size of at least one of said template block and said search area from each other, the size of said template block representing a number of pixels to be used for motion vector estimation among pixels in a macroblock serving as a unit in said block matching method, and the size of said search area representing a size of a range for searching the motion vector;

control circuitry for setting the search areas of said plurality of motion vector detecting units so as to allow a motion vector search range for a whole of said plurality of motion vector detecting units in the reference picture to be varied in accordance with a characteristic of the current picture including said template block; and motion vector determining circuitry receiving motion vector information from said plurality of motion vector detecting units to determine a final motion vector for said template block.

2. The motion vector detecting apparatus according to claim 1, wherein said plurality of motion vector detecting units include an integer precision motion vector detecting unit for detecting the motion vector in an integer precision and a fractional precision motion vector detecting unit for detecting the motion vector in a fractional precision.

3. The motion vector detecting apparatus according to claim 1, wherein said plurality of motion vector detecting units include motion vector detecting units differing in template block size from one another;

said control circuitry includes a circuit for allocating, when said current picture is a bi-directionally predictive picture for which the motion vector is detected using two reference pictures different in time, a reference picture out of the two reference pictures that is closer in time to said current picture to a motion vector detecting unit larger in the template block size, and also for allocating another reference picture that is more distant in time from said current picture of said two reference pictures to a motion vector detecting unit smaller in the template block size.

4. The motion vector detecting apparatus according to claim 1, wherein said plurality of motion vector detecting units include a first motion vector detecting unit having a larger search area size and a second motion vector detecting unit having a smaller search area size; and said control circuitry includes a circuit for allocating, when said current picture is a bi-directionally predictive picture for which the motion vector is detected using two reference pictures different in time, a reference picture closer in time to said current picture out of the two reference pictures to said first motion vector detecting unit, and also for allocating another reference picture that is more distant in time from said current picture to said second motion vector detecting unit.

5. The motion vector detecting apparatus according to claim 1, wherein said plurality of motion vector detecting units include a first motion vector detecting unit larger in template block size and smaller in search area size, and a second motion vector detecting unit of smaller in said template block size and larger in said search area size; and said control circuit includes a circuit for allocating, when said current picture is a bi-directionally predictive picture for which the motion vector is detected using two reference pictures different in time, a reference picture of said two reference pictures that is closer in time to said current picture to the first motion vector detecting unit, and also for allocating another reference picture of said two reference pictures to the second motion vector detecting unit.

6. The motion vector detecting apparatus according to claim 2, wherein said control circuitry includes a circuit for allocating, when said current picture is a bi-directionally predictive picture for which the motion vector is detected using two reference pictures different in time, a reference picture of said two reference pictures that is closer in time to said current picture to said fractional precision motion vector detecting unit, and also for allocating another reference picture of said two reference pictures to said integer precision motion vector detecting unit.

7. The motion vector detecting apparatus according to claim 1, wherein said control circuitry includes a circuit for allocating sub-search areas different from each other for said template block to said plurality of motion vector detecting units, when said current picture is a unidirectionally predictive picture for which the motion vector is detected using a reference picture present on one direction side in time relative to said current picture, said sub-search areas as a whole determining a motion vector search range for said template block.

8. The motion vector detecting apparatus according to claim 1, wherein said control circuitry includes a circuit for setting motion vector search ranges each having a different pixel point on a screen as a center point, to allocate the search ranges with different center points to said plurality of motion vector detecting units, when said current picture is a unidirectionally predictive picture for which the motion vector is to be detected using a reference picture present on one direction side in time relative to said current picture.

9. The motion vector detecting apparatus according to claim 1, wherein said control circuitry includes a circuit for setting search areas each having as a center point a pixel point that is different from a center point of said template block, to allocate the search areas to said plurality of motion vector detecting units when said current picture is a unidirectionally predictive picture for which the motion prediction is performed using a reference picture present on one direction side in time relative to said current picture.

10. The motion vector detecting apparatus according to claim 8, wherein one of said different center points is a real rear point corresponding to a center point of said template block.

11. The motion vector detecting apparatus according to claim 8, wherein said search areas different in center point are different in size from each other.

12. The motion vector detecting apparatus according to claim 7, wherein said sub-search areas different from each other are different in size.

* * * * *